(12) United States Patent
Tikhonski et al.

(10) Patent No.: US 11,171,507 B2
(45) Date of Patent: Nov. 9, 2021

(54) CONNECTION OF BATTERY SYSTEM TO ELECTRICAL DISTRIBUTION BUS

(71) Applicant: LiTech Laboratories, LLC, Austin, TX (US)

(72) Inventors: Alexei Tikhonski, Austin, TX (US); Robert L. Myers, Austin, TX (US); James P. Novak, Austin, TX (US)

(73) Assignee: Litech Laboratories, Inc., Austin, TX (US)

( * ) Notice: Subject to any disclaimer, the term of this patent is extended or adjusted under 35 U.S.C. 154(b) by 0 days.

(21) Appl. No.: 16/760,762

(22) PCT Filed: Dec. 22, 2017

(86) PCT No.: PCT/US2017/068301
§ 371 (c)(1),
(2) Date: Apr. 30, 2020

(87) PCT Pub. No.: WO2019/125495
PCT Pub. Date: Jun. 27, 2019

(65) Prior Publication Data
US 2020/0350779 A1 Nov. 5, 2020

(51) Int. Cl.
*H02J 9/06* (2006.01)
*H02J 7/00* (2006.01)

(52) U.S. Cl.
CPC .......... *H02J 9/068* (2020.01); *H02J 7/0029* (2013.01); *H02J 7/0063* (2013.01)

(58) Field of Classification Search
CPC .......... H02J 9/068; H02J 7/0029; H02J 1/086; H02J 7/0063; H02J 9/061
See application file for complete search history.

(56) References Cited

U.S. PATENT DOCUMENTS 5,598,041 A * 1/1997 Willis ............... H02J 1/108
307/43
5,764,032 A   6/1998 Moore
(Continued)

FOREIGN PATENT DOCUMENTS

CN     105429280 A    3/2016
CN     105591460 A    5/2016
(Continued)

OTHER PUBLICATIONS

Russian International Searching Authority; International Search Report & Written Opinoin for PCT/US2017/068301; dated Aug. 23, 2008; 6 pages.
(Continued)

*Primary Examiner* — Jared Fureman
*Assistant Examiner* — Duc M Pham
(74) *Attorney, Agent, or Firm* — Kelly Kordzik; Jerry Keys; Matheson Keys & Kordzik PLLC

(57) ABSTRACT

A backup system for a power supply unit providing power to a load via a distribution bus includes a power source, a network of switching elements coupled between an output terminal of the power source and the distribution bus, diodes coupled in parallel with the switching elements, and a controller configured to selectively activate or deactivate each of the switching elements to enable the power source to power the load via the distribution bus. The switching elements may be transistors, and the diodes may be parasitic body diodes of the transistors. The power source may be a battery, such as a rechargeable battery. An output voltage level from the battery may be regulated by the controller as a function of a number of the activated or deactivated transistors.

22 Claims, 13 Drawing Sheets

(56) References Cited

U.S. PATENT DOCUMENTS

| | | | |
|---|---|---|---|
| 7,038,522 B2 * | 5/2006 | Fauh | H02J 9/061 327/407 |
| 7,893,560 B2 * | 2/2011 | Carter | H02J 9/061 307/64 |
| 8,044,639 B2 * | 10/2011 | Tamegai | H02J 7/00309 320/138 |
| 9,065,277 B1 | 6/2015 | Kim et al. | |
| 9,490,662 B2 * | 11/2016 | Shinohara | H02J 9/06 |
| 10,658,840 B2 * | 5/2020 | Humphrey | H02J 9/061 |
| 2004/0263121 A1 | 12/2004 | Breen et al. | |
| 2004/0263123 A1 * | 12/2004 | Breen | H02J 7/0022 320/128 |
| 2008/0278116 A1 | 11/2008 | Matsunaga | |
| 2018/0143263 A1 * | 5/2018 | Humphrey | H02J 3/24 |

FOREIGN PATENT DOCUMENTS

| | | |
|---|---|---|
| CN | 105790423 A | 7/2016 |
| JP | H1023678 A | 1/1998 |
| JP | 2004096857 A | 3/2004 |
| JP | 2004297851 A | 10/2004 |
| JP | 2005253220 A | 9/2005 |
| JP | 2008283743 A | 11/2008 |
| RU | 2487392 C2 | 7/2013 |
| TW | I550987 A | 9/2016 |
| WO | 2016/085460 A1 | 6/2016 |
| WO | 2016085460 A1 | 6/2016 |
| WO | 2017/014720 A1 | 1/2017 |

OTHER PUBLICATIONS

Texas Instruiments; User's Guide; bq76200 High Voltage Battery Pack Front-End Charge/ Discharge High-Side NFET Driver Evaluation Module; 21 pages; Jul. 2015.

Texas Instruiments; Product Preview bq76200 High Voltage Battery Pack Front-End Charge/ Discharge High-Side NFET Driver; 22 pages; Sep. 2015.

European Patent Office; Extended European Search Report for corresponding EP 17935405; dated Oct. 5, 2020; 8 pages; Munich, DE.

Taiwan Patent Office; Office Action and Search report dated Aug. 20, 2021 for corresponding Taiwan Application No. 107144999; 4 pages; Taipei, TW.

Japanese Patent Office; Office Action for corresponding JP Serial No. 2020-53451; dated Aug. 30, 2021; 6 pages; Tokyo, JP.

Japanese Patent Office; English translation of Office Action for corresponding JP Serial No. 2020-534541; dated Aug. 30, 2021, translation received Sep. 15, 2021; 7 pages; Tokyo, JP.

* cited by examiner

CONNECTION OF BATTERY SYSTEM TO ELECTRICAL DISTRIBUTION BUS

TECHNICAL FIELD

The present invention relates in general to battery technology, and in particular, to a system for monitoring battery cells and controlling their discharge when connected to an electrical distribution bus.

BACKGROUND INFORMATION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Modern information technology and telecommunication systems contain electrical distribution busses that operate at a wide variety of distribution bus voltages. For example, computer servers commonly distribute 12 volts ("V") to their internal subsystems such as memory, processor, storage, cooling fans, and I/O (such internal subsystems to which a distribution bus provides a supply voltage are referred to herein as a "load circuit," or simply a "load"). Wired telecommunications systems use a 48 V distribution, and wireless telecommunications and cell site systems often use 24 V. All of the above-mentioned systems share several common characteristics in that these distribution busses may carry tens or even hundreds of amperes of electrical current under normal operation, and generally have requirements that the voltages on these busses be regulated to ensure that a maximum voltage excursion on the bus be limited to a fixed value above or below a desired nominal value. A regulated distribution bus will have a specified voltage tolerance applied to its nominal value. For example, a 12 V distribution bus with a +/−10% tolerance will have an operational envelope ranging from 13.2 V to 10.8 V.

Within the last five years, battery systems have been developed that are optimized for delivering very high electrical currents for short durations. Battery systems typically include one or more battery cells (herein, the terms "battery" and "cell" may be used interchangeably). Because of their small size, these have become attractive in some equipment types for the purpose of replacing a traditional Uninterruptable Power Supply ("UPS") serving the role of a short-term electrical backup of equipment in the event of AC main power outages. These high power battery systems are unique in their capability to deliver a very high discharge current, but have a shortcoming of only being capable of slowly accepting a charging current. This ratio of discharge current to charge current can be as high as 30:1, or even 40:1, with technology that is on the market today.

High power battery systems used today for short duration backup applications typically employ output regulators in the form of DC-DC converters capable of processing high energy (e.g., an output DC-DC converter) to match the output voltage of the battery system to the distribution bus voltage, and to prevent the backflow of current from the distribution bus into the batteries, which would result in unsafe charging currents and represent a safety hazard. In many of today's systems, a charging current is provided through a separate path from discharge current, and may be provided by a separate, low power charging DC-DC converter. Thus, there exists an opportunity for cost reduction and electrical efficiency improvement if such a high energy output DC-DC converter could be eliminated or replaced with a different scheme possessing higher electrical efficiency and lower cost, while allowing a battery system to be directly connected to the distribution bus through this improved scheme.

There exists today prior art for the direct connection of battery systems to electrical busses, almost all of which use either high-side or low-side Metal Oxide Semiconductor Field Effect Transistor ("MOSFET") pairs acting as switched elements (also referred to herein as simply "switches") for ON/OFF control of charge and discharge current. MOSFETs are commonly used in these applications because they contain, by nature of their fabrication process, a diode (i.e., a body diode), which allows current to flow in one direction through the MOSFET even when the MOSFET is turned OFF. This body diode represents a problem in many applications, but is actually utilized as an advantage in embodiments of the present invention.

Many of today's battery systems utilize two switches positioned back-to-back, each of which includes either a parasitic body diode in parallel with each switch or an external diode across the switch. The switch with the forward facing diode (facing from the battery to the load) is considered the "Charge" switch (in its OFF state, it blocks any charging current), and the other switch is the "Discharge" switch (in its OFF state, it blocks any discharge current). This scheme works for low power distribution busses where the following conditions are met: (1) total current capacity of the bus (either available on the bus or consumed by the load coupled to the bus) does not exceed either the safe charge or discharge currents of the battery, (2) the distribution bus voltage is controllable such that it can be raised sufficiently high when needed in order for the battery to receive a full charge after it becomes discharged, and (3) the allowable operating voltage of the load circuit ranges between or includes the minimum battery terminal voltage when the battery is fully discharged (i.e., 0% state of charge), and the maximum battery terminal voltage when the battery is fully charged (i.e., 100% state of charge). However, it is not practical to use this approach when the voltage on the bus requires tight regulation (e.g., as required by the load) such that it must remain below the fully charged voltage of the battery; nor can it be used when the current normally available from the bus exceeds a safe level of charging current for the battery.

The industry standard for direct connection of single or multi-cell battery systems to distribution busses is seen in low power systems such as implemented for notebook and tablet computers, as well as cell phones. These devices use the previously mentioned "back-to-back" configuration of single transistor switches for charge and discharge control. FIG. 1 illustrates a "high-side" configuration of switches, where the switches $Q_1$ and $Q_2$ (e.g., MOSFETs) are arranged such that the switches are connected to the high voltage side (+ side) of the battery. The switches $Q_1$ and $Q_2$ are connected so that the battery can be charged and discharged depending on which of the two switches is turned ON. A controller is coupled to each of the switches and exerts control over which of the switches is turned ON, under what conditions, and for what duration. Charge and discharge control is thus exerted by the controller. The controller may allow or disallow charge or discharge based on battery state of health, level of charge, instantaneous capacity, voltage, current, temperature, or any other parameters that the designer may select. The combination of the switches, their parasitic body diodes, and the controller allow charge control, discharge control, or complete electrical isolation of the output terminals of the battery.

This dual switch control scheme works in many battery applications where the charge current, discharge current, and available bus currents are close in magnitude, or where the allowable charge current is considerably higher than the available bus current. Laptop computer batteries have a typical design point where the charge rate is approximately equal to the discharge rate, e.g., near 1C (i.e., one times the nominal battery capacity, C). Portable phone batteries can be designed to have higher charge rates (e.g., up to 4C), but typically have very low discharge rates. This allows phones to be charged quickly while at the same time having a long operational life on a single charge. At these low charge and discharge rates, the parasitic body diodes of the switches have adequate thermal and power capabilities to pass the necessary charge and discharge currents with minimal temperature rise and power loss.

However, there are an increasing number of real world examples of systems possessing battery charge-discharge asymmetry where the allowable discharge rate far exceeds the allowable charge rate. For example, batteries serving electrical backup duty are commonly designed for charge times of 60-90 minutes, with high-rate discharge times that can fully deplete the batteries in 60-90 seconds. This very large disparity between normal charge and normal discharge currents (i.e., a large charge-discharge current asymmetry) makes the dual-switch control scheme of FIG. 1 impractical. Specifically, the body diode seen in the charge switch is completely unsuitable to carry the discharge current that it would see if such a scheme were used, as its voltage drop and power dissipation would adversely affect the operation of the system. Additionally, in the example of a tightly regulated +12 V distribution bus with a lithium-ion battery as the energy storage device, the battery selected for such an application would need to be as close to +12 V as possible (e.g., 3 or 4 series-connected cells charged to 4.0 V per cell). As can be seen by one of ordinary skill in the art, it would not be possible to fully charge this battery from a +12 V source through an isolating diode possessing poor forward voltage characteristics (such as usually seen in the parasitic body diodes of conventional MOSFETs).

In addition to the isolation switches previously described, regulating systems have been designed for controlling the electrical output when converting battery voltage to connect to a power bus. For example, a linear regulator can be used to provide a uniform voltage output at a specific value or set point. Referring to FIG. 2, there is illustrated a feedback circuit that includes an operational amplifier ("OPAMP") that drives a series-pass element (e.g., a transistor with a diode in parallel). In such regulation systems, the circuit of FIG. 2 essentially replaces the Discharge Control Switch $Q_2$ of FIG. 1 to provide a regulated voltage output at the load until a crossover point where the minimum voltage drop across the series-pass element creates a voltage drop between the input to the linear regulator and its output (i.e., between the battery terminal and the load terminal) sufficient to bring the voltage at the load terminal below the minimum operating voltage threshold (e.g., a minimally acceptable operating voltage level) of the load circuit.

Such a linear regulator may work when implemented for low-power devices. However, there are many deficiencies that arise as the power levels increase. First is that the series-pass element is operated in its linear mode, where the voltage difference between input and output voltages is imposed on the series-pass element, which in the case of high currents creates a very high power loss and V-I based heat generation. This generated heat must be transferred to the environment or otherwise removed from the device, otherwise this heat will concentrate inside the series-pass element package, and even high-powered transistors will quickly overheat and fail. A package that can handle the heat generated from this power loss would require a very large physical package with a direct-mount heatsink. Most high power battery systems have physical space limitations and manufacturing constraints that discourage the use of this type of transistor packaging. Moreover, it is difficult to find a surface mount transistor ("SMT") capable of dissipating enough heat through its printed circuit board ("PCB") contacts to be practical.

Switching regulators are also used to convert battery voltage to a fixed bus voltage. Generally, a step-down or "buck" converter requires an input voltage higher than its output voltage to achieve its highest efficiency. This results in a series-connected battery stack with a higher series cell count to present the higher input voltage to the converter necessary to achieve high efficiency and a manageable switching duty cycle. However, such a higher cell count can increase cost, circuit complexity, total circuit packaging volume, and battery management system ("BMS") component count and complexity.

DETAILED DESCRIPTION

It will be understood that particular embodiments described herein are shown by way of illustration and not as limitations of embodiments of the invention. The principal features of this invention can be employed in various embodiments without departing from the scope of the invention.

As an alternative to linear or switching regulators as previously disclosed, embodiments of the present invention provide a set of individually controlled switches (e.g., MOSFETs) that connect a power source (e.g., a battery terminal voltage) to an output (e.g., a distribution bus) to which may be connected a load circuit. In accordance with embodiments of the present invention, when MOSFETs are utilized as the switches, the MOSFETs are operated in a predetermined (e.g., programmed) manner to take advantage of inherent forward voltage drops of the body diodes of the MOSFETs and/or an external resistance (e.g., a resistive element) coupled in series with each MOSFET to regulate the delivery of an output voltage from a battery stack. Such circuitry may be configured to replace a battery discharge DC-DC converter, withstand high discharge currents, and/or operate more efficiently in many of the operating modes as compared to linear or switching regulators operating at high power.

Embodiments of the present invention provide a system for connection of a battery system to a distribution bus utilizing programmably activated (e.g., sequential, binary counting, or any other sequence) charge and/or discharge control switches (e.g., MOSFETs) operated under programmed control, which can replace the previously disclosed feedback controlled linear or switching DC-DC converter regulators. Embodiments disclosed herein may implement either N (where N≥1) series-connected charge control switches (e.g., see FIGS. 3 and 6) and/or N (where N≥1) parallel-connected discharge control switches (e.g., see FIG. 7).

Figure 8:
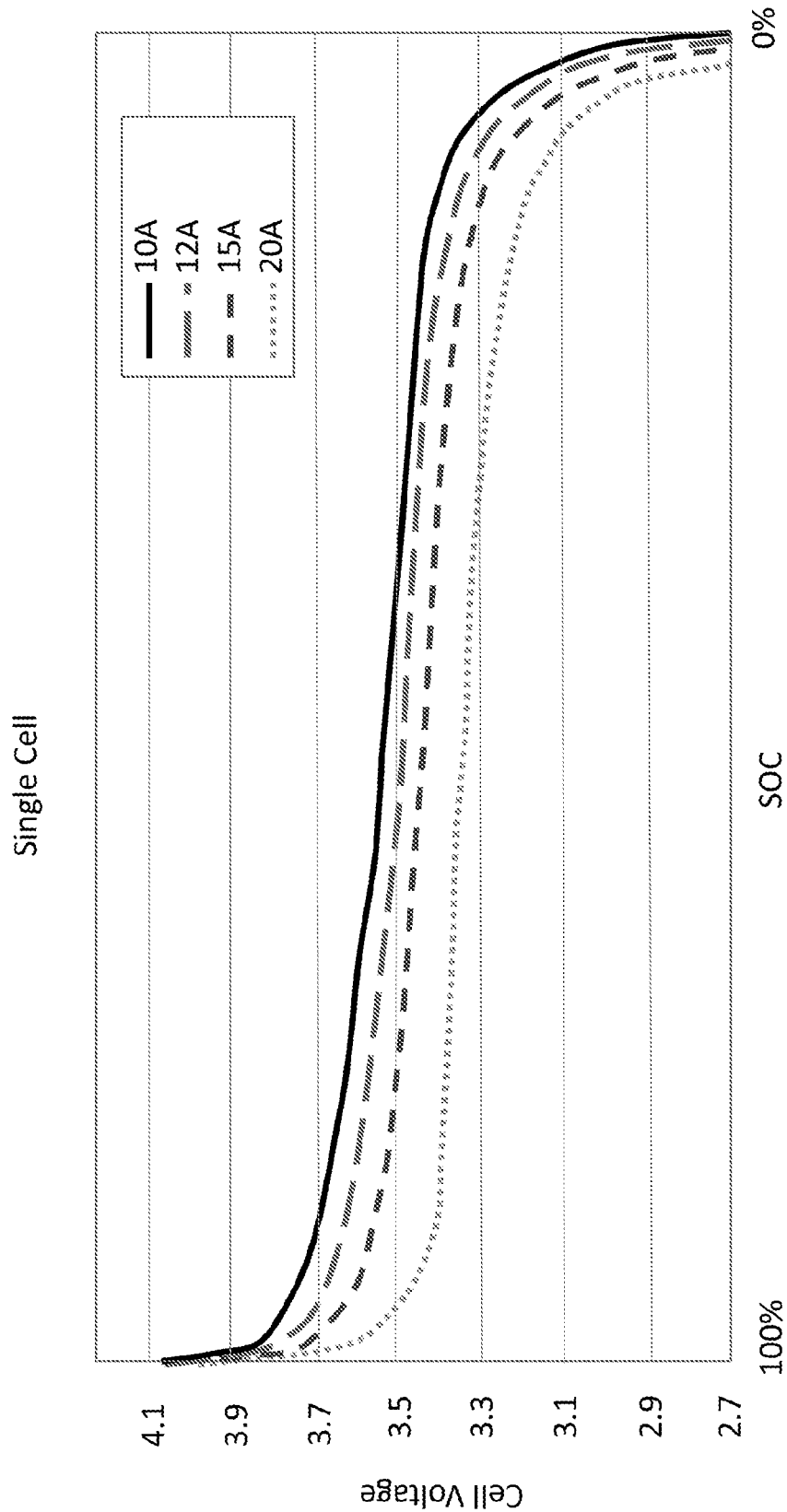
FIG. 8 illustrates a plot of a family of voltage curves versus state of charge ("SOC") at different possible load currents for a single exemplary lithium-ion rechargeable battery cell.

Referring to FIG. 8, to understand how either a series connection of charge control switches or a parallel connection of discharge control switches can control application of a battery discharge voltage as well as provide an equivalent output voltage regulation, the characteristic operations of a typical battery are now discussed. FIG. 8 illustrates a plot of a family of voltage curves versus state of charge ("SOC") at different possible load currents for a single exemplary lithium-ion rechargeable battery cell. These curves define the operating envelope within which the battery voltage may operate for various combinations of battery current and SOC.

Rechargeable batteries, such as Lithium-ion ("Li-ion") based rechargeable batteries, can be constructed with different internal materials and specific chemical compositions that define the operational voltage range, the maximum discharge current, the internal impedance, and the specific capacity of each battery cell. Each of these parameters defines a family of discharge voltage versus discharge current curves unique to each type of cell.

Batteries are constructed with a given chemical capacity as given by the finite amount of active chemical materials in the battery. The capacity is measured by discharge at a given current and the time measured until a certain minimum voltage is achieved. The capacity is typically reported in milli-amp-hours ("mAh") or amp-hours ("Ah"). This capacity is represented herein by the letter "C," corresponding to the continuous current available from the battery for 1 hour that results in the battery discharging from a state of 100% SOC (fully charged) to a state of 0% SOC (fully discharged).

For any given discharge current, the terminal voltage of the battery will drop in accordance to its state of charge ("SOC"). The 100% full SOC is represented by the maximum charge voltage of the cell. The 0% full, or 100% empty, SOC is represented by the minimum discharge voltage of the cell. The SOC will decrement from 100% to 0% as the chemical capacity of the battery is depleted.

Voltage curves versus SOC at different load currents representing an exemplary Li-ion battery cell with a capacity of 1 Ah during current demands of 10A ("amps"), 12A, 15A, and 20A are shown in FIG. 8. As can be readily seen, the terminal voltage of a battery for a given SOC will shift lower as a function of an increase in current demand. The distances between the curves on the voltage scale as current demand increases are due to the cell's internal resistance or impedance. The higher the internal impedance, the lower the battery terminal voltage will be for a given applied current load. Thus the battery terminal voltage at a given SOC is dependent not only on SOC, but on the load current demand as well, and exists within the operating envelope defined by the characteristic curves.

As can be appreciated from the illustration of FIG. 8, the output (discharge) voltages of typical batteries are not constant, but variable with load current and SOC, and thus a typical battery does not possess an inherent capability to regulate or maintain its discharge voltage within a specific voltage range over the time it takes for the stored energy to be depleted from the battery or with changing load currents. However, as previously mentioned, it is very common in power systems that any sources feeding power to the distribution bus be required to regulate the voltages supplied to the distribution bus to ensure that a maximum voltage excursion on the distribution bus be limited to a specified fixed value above or below a desired nominal value, i.e., the allowable range of voltages that can be tolerated by the load, e.g., to ensure error-free operation (herein referred to as the "specified load voltage tolerance range"). This is one of the reasons why voltage regulators, such as those previously noted, have been implemented in order to maintain the output voltage supplied (e.g., by a battery or other source) to a distribution bus within such a specified load voltage tolerance range.

Figure 9:
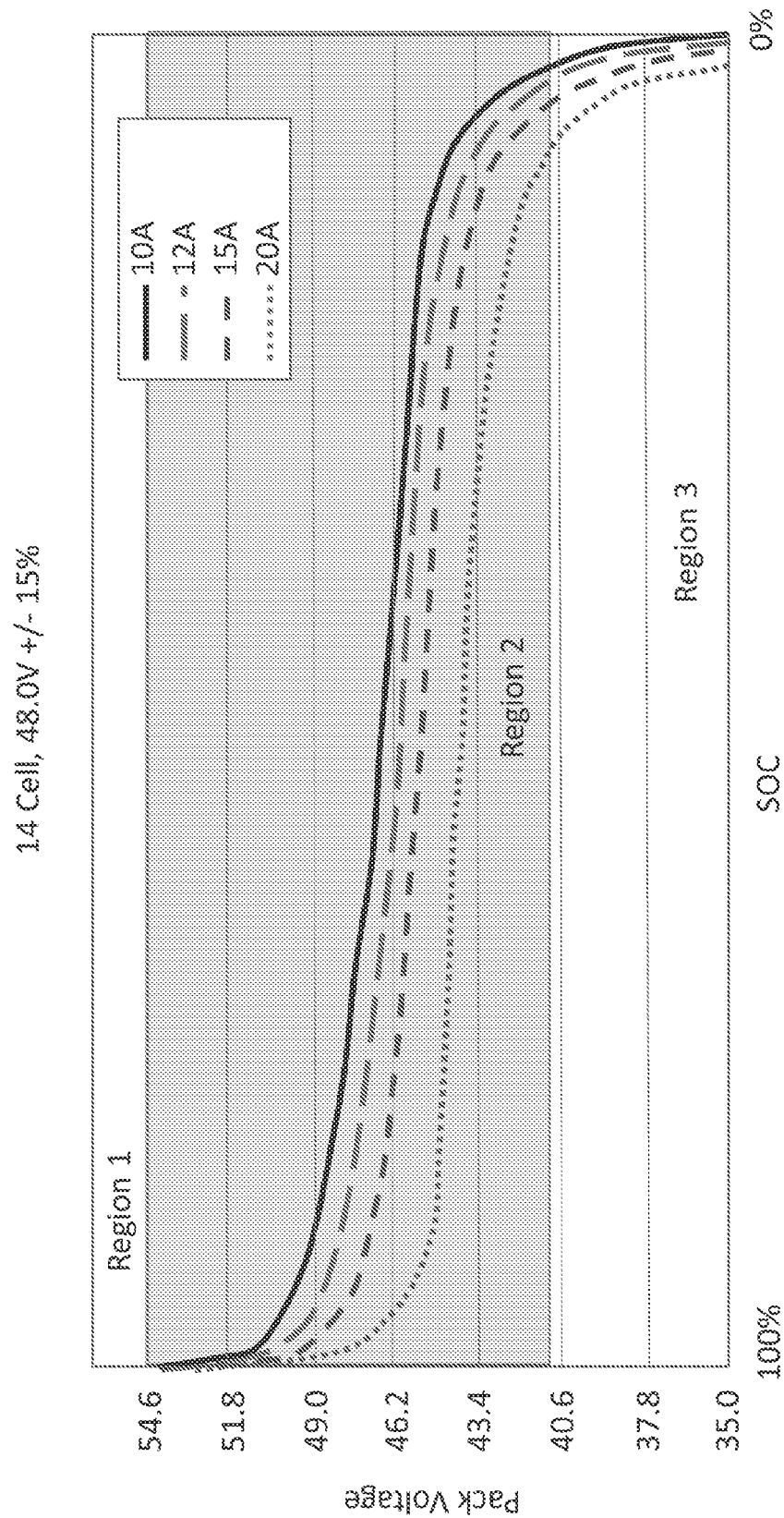
FIGS. 9-11 illustrate plots of families of voltage curves versus SOC that result from different numbers of series-connected exemplary lithium-ion rechargeable battery cells as described in FIG. 8.
Figure 10:
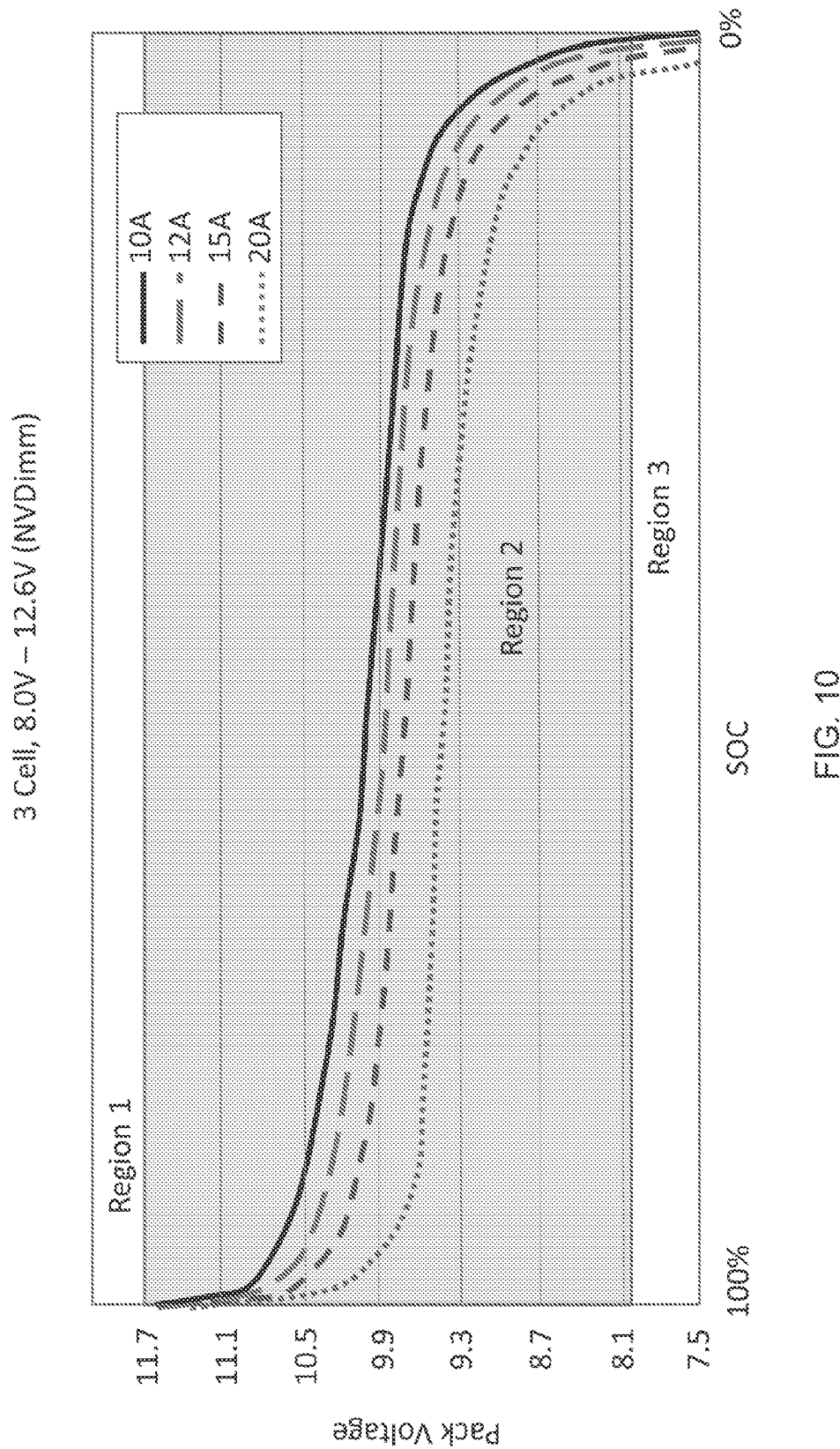
Figure 11:
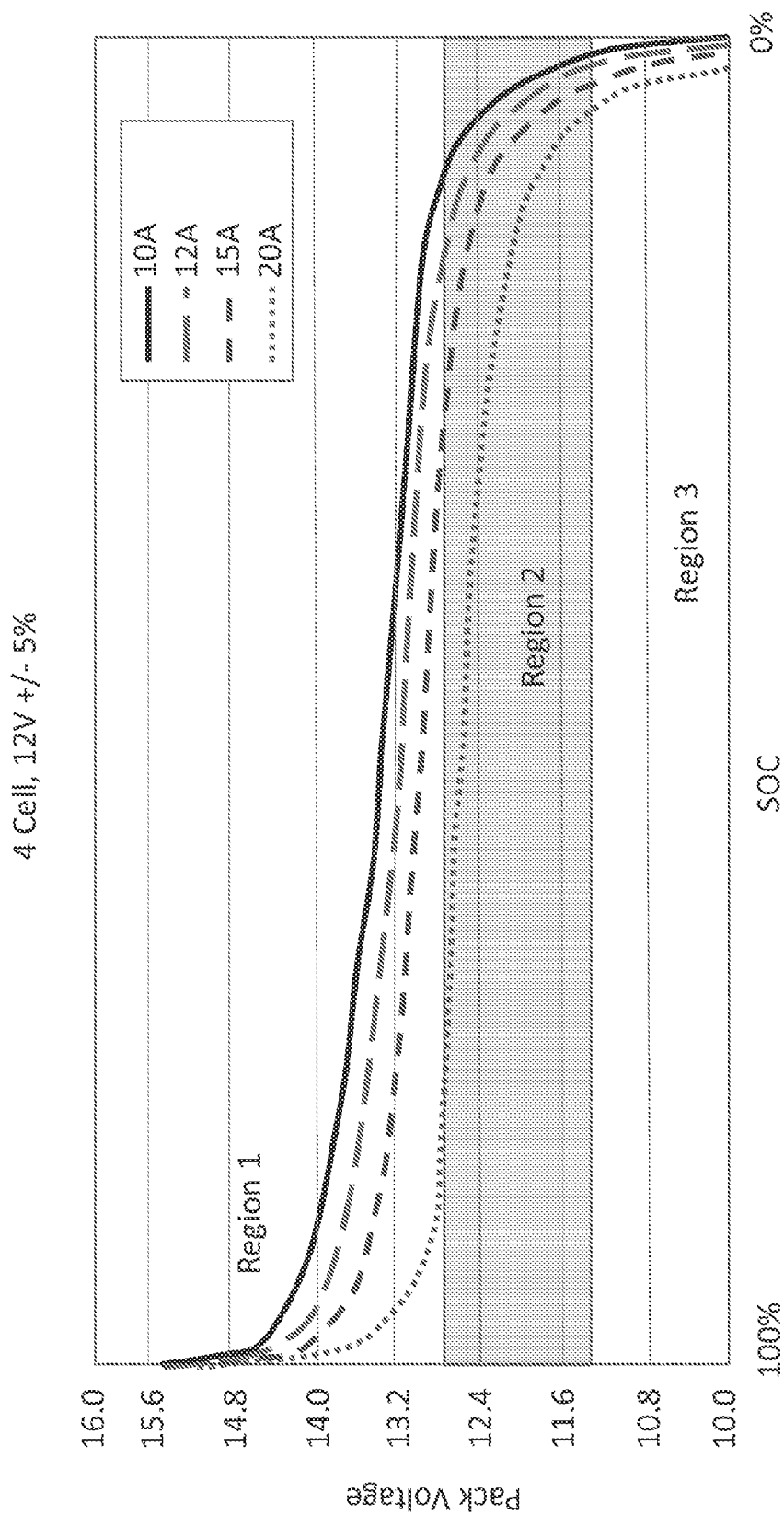

FIGS. 9-11 illustrate plots of families of voltage curves versus SOC that result from different numbers of series-connected exemplary lithium-ion rechargeable battery cells as described in FIG. 8. Different numbers of series-connected cells may be required to achieve specific battery stack voltages that are compatible with different commonly implemented distribution bus voltages.

Referring to the examples illustrated in FIGS. 9-11, defined herein are three voltage regions relative to the specified load voltage tolerance range that is required to be delivered to a load via the distribution bus. Superimposed on each set of curves is a gray-shaded region corresponding to the specified load voltage tolerance range. The result of this superimposition is that each plot is divided into three regions. Region 1 is defined as all operating points where the supply voltage (e.g., as supplied by a power source, such as a battery) exists above the specified load voltage tolerance range (the region above the gray-shaded region). This is equivalent to the supply voltage being higher than the maximum voltage within the specified load voltage tolerance range. Region 2 is defined as all operating points where the supply voltage exists within the specified load voltage tolerance range (within the gray-shaded region). Region 3 is defined as all operating points where the supply voltage exists below the specified load voltage tolerance range (the region below the gray-shaded region). Region 3 is equivalent to the supply voltage being lower than the minimum voltage within the specified load voltage tolerance range.

FIG. 9 illustrates a plot of a family of voltage curves versus SOC at different possible load currents for an exemplary 48 V battery stack of 14 series-connected battery cells, such as the battery cell described with respect to FIG. 8. It should be noted that, in this example, the specified load voltage tolerance range (noted as Region 2) is equal to the total battery stack voltage for substantially all values of battery current and SOC except at the very end of discharge (e.g., SOC less than about 7%), i.e., the battery operating characteristics lie substantially within Region 2 until almost all of the energy stored in the battery is depleted.

FIG. 10 illustrates a plot of a family of voltage curves versus SOC at different possible load currents for an exemplary 12 V battery pack of 3 series-connected battery cells, such as the battery cell described with respect to FIG. 8. As in FIG. 9, it should be noted that the specified load voltage tolerance range (noted as Region 2) is equal to the total battery stack voltage for substantially all values of battery current and SOC except at the very end of discharge (e.g., SOC less than about 5%), i.e., the battery operating characteristics lie substantially within Region 2 until almost all of the energy stored in the battery is depleted.

FIG. 11 illustrates an exemplary family of voltage curves versus SOC at different load currents for a 12 V battery pack of 4 series-connected battery cells, such as the battery cell described with respect to FIG. 8. It should be noted that, in this example, the battery operating characteristic curves at high SOCs exist in Region 1 of the plot, which is above the specified load voltage tolerance range (noted as Region 2). When the battery is operating within Region 1, voltage regulation (e.g., reduction) of the voltage supplied to the distribution bus from the battery should be implemented before the resulting reduced voltage is delivered to the load to prevent the voltage supplied to the load from varying to levels lying outside of the specified load voltage tolerance range (noted as Region 2).

For example, as shown in FIG. 11 (and as will be further described with respect to FIGS. 6 and 7), a specified load voltage tolerance range (noted as Region 2 in FIG. 11) may be more narrow than the entire discharge voltage range of a battery stack implemented for backup purposes. Nevertheless, embodiments of the present invention are able to be implemented without the utilization of conventional voltage regulators but yet capable of maintaining (regulating) an output voltage supplied from the battery stack to the distribution bus substantially within the specified load voltage tolerance range.

Figure 1:
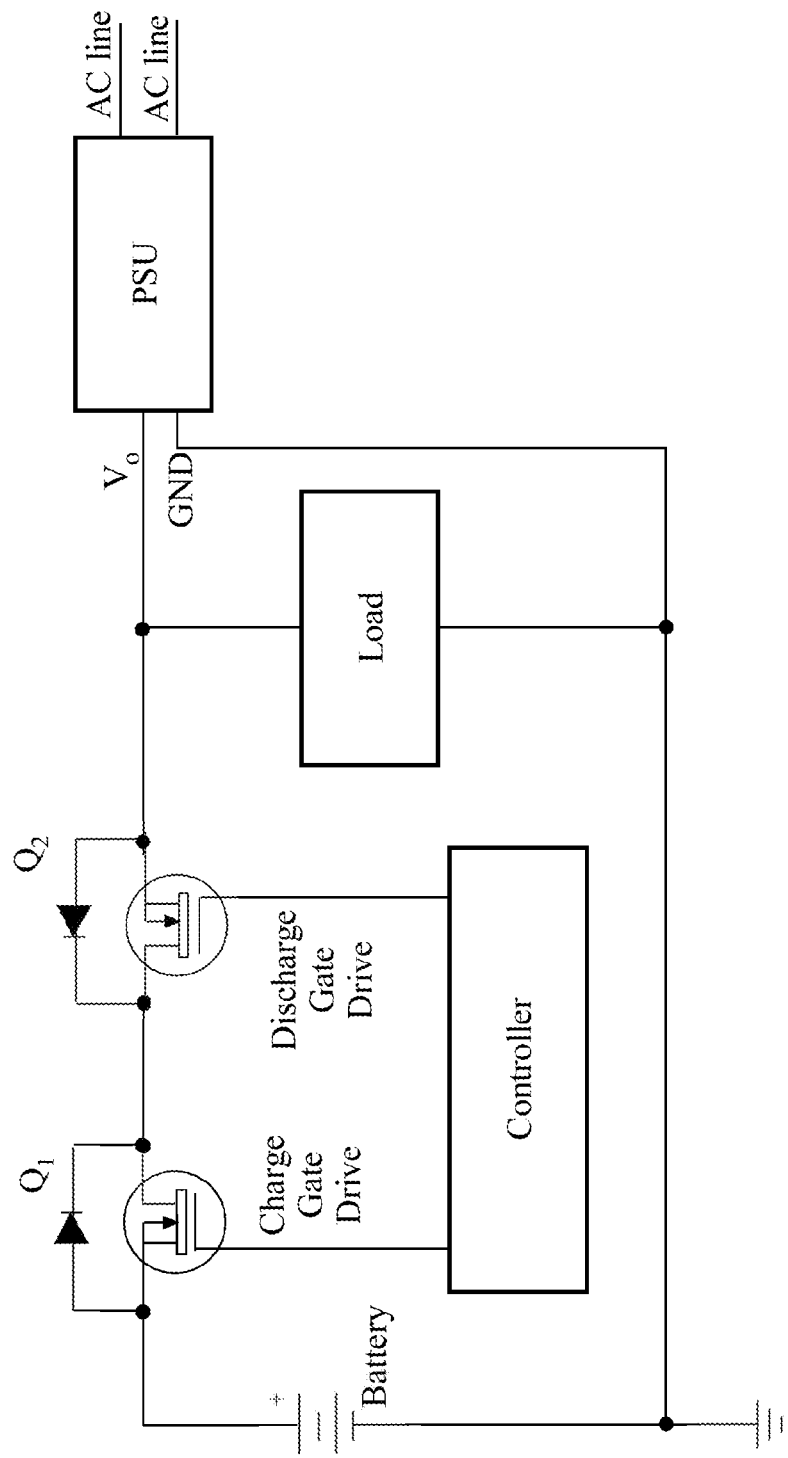
FIGS. 1 and 2 illustrate prior art systems for connecting a battery system to a distribution bus.
Figure 2:
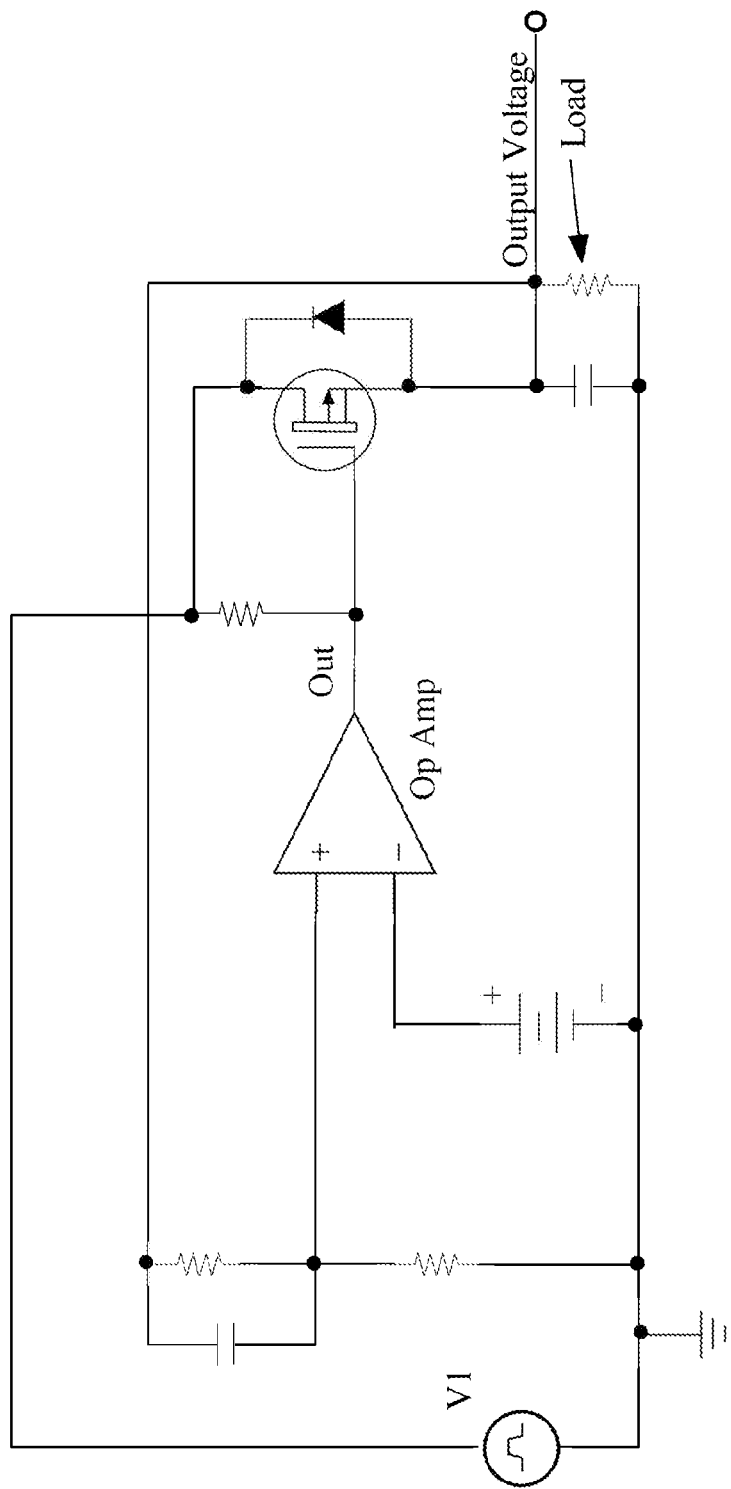
Figure 3:
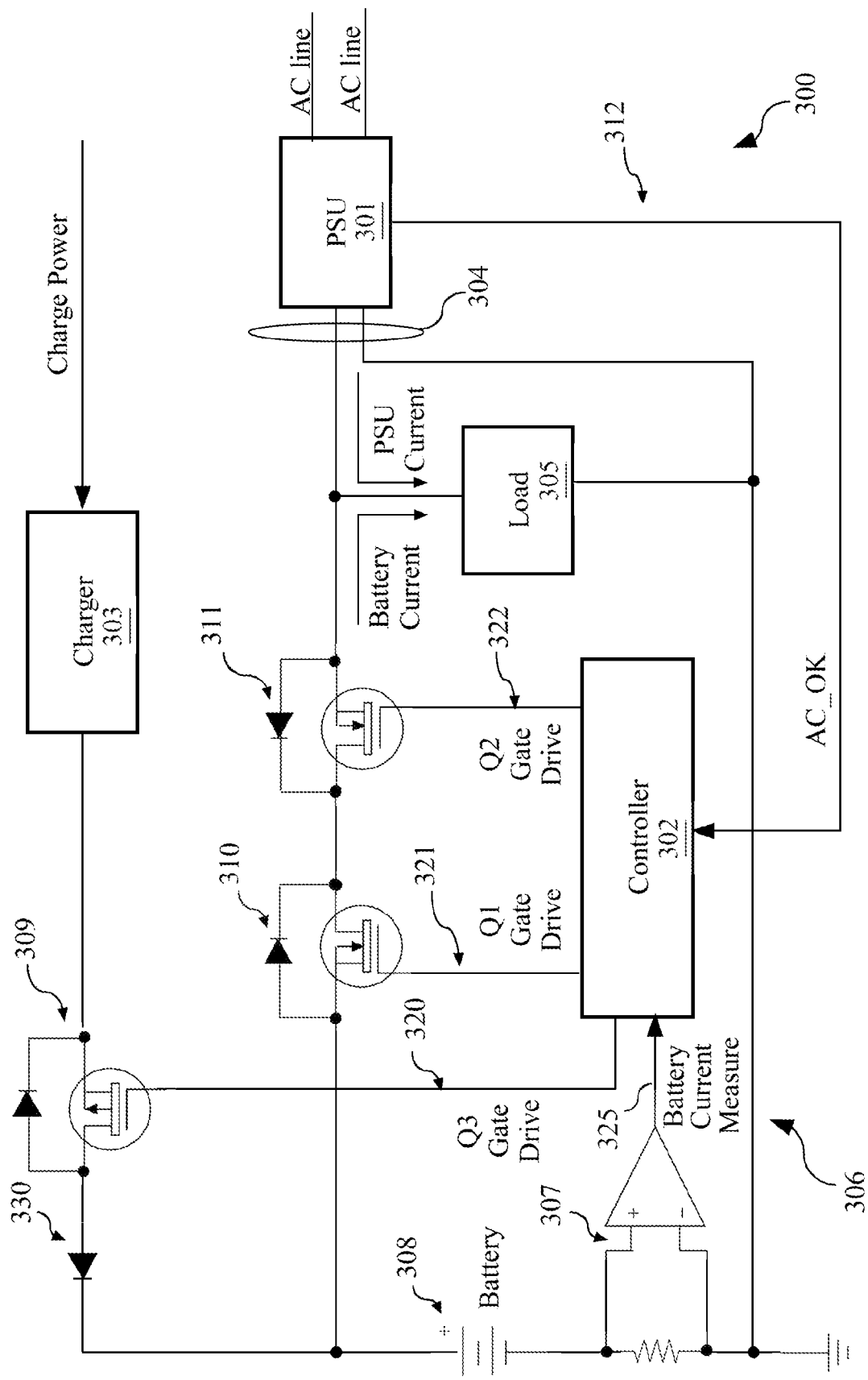
FIG. 3 illustrates a system configured in accordance with embodiments of the present invention.

FIG. 3 illustrates a circuit block diagram of a system 300 configured in accordance with embodiments of the present invention. The system 300 includes a battery system 306 configured to selectively couple an output terminal of a battery 308 to a distribution bus 304 through a defined configuration of switches. In this example the terminal voltage characteristics of battery 308 are similar to those depicted in FIG. 10, where the battery voltage corresponding to all operating points (combinations of current and SOC) lie within the specified load voltage tolerance range (i.e., all battery operating points exist within the Region 2 area of the characteristic curves). In accordance with embodiments of the present invention, this defined switching configuration includes series-connected switches (in this non-limiting exemplary embodiment, the number, N, of discharge control switches is 1 (labeled as 311 in FIG. 3)) coupled between the battery 308 and the distribution bus 304, which is coupled to a well-known power supply unit ("PSU") 301 powered via a well-known AC Line input voltage. The PSU 301 converts the AC Line input voltage to a DC output voltage, which feeds the distribution bus 304 to which one or more load circuits (herein also simply referred to as the "load") 305 are connected.

In accordance with embodiments of the present invention, the battery system 306, the defined configuration of switches, and the PSU 301 combine to form a multi-switch battery backup unit ("BBU"). The BBU can be configured to function as a normal power supply when the AC Line input voltage is present and within normal operating limits. If the output of the PSU 301 falls (e.g., due to an AC Line input voltage loss or internal malfunction of the PSU 301), the system 300 may be configured to supply sufficient power from the battery 308 to operate the load 305 for a predetermined minimum duration (e.g., long enough to switch to generator back up or complete a proper shut-down procedure). Thus, the battery system 306 may be configured to function as a backup power source should the AC Line input voltage to the PSU 301 fail (or is not within a normal or required operating range), or the PSU 301 experiences an internal component failure or unexpectedly ceases operation. In accordance with embodiments of the present invention, the battery system 306 includes the battery 308 and a controller 302. The controller 302 may include any circuitry configured to perform the functions described herein, or be implemented as any other circuitry, integrated circuit ("IC") module, or microprocessor capable of performing the functions described herein with respect to the controller 302. The battery 308 may be implemented as one or more battery cells (e.g., one or more Li-ion cells configured in a battery stack).

In accordance with embodiments of the present invention, any one or more of the switches 309-311 may be implemented as FETs, such as MOSFETs, of a p-type or n-type, wherein the circuitry within the controller 302 can be configured to appropriately and independently turn ON and OFF each of the FETs 309-311 (e.g., via the gate drive lines 320-322, respectively) as needed to implement various functions described herein. Alternatively, any one or more of the switches 309-311 may be replaced with any circuitry suitable to perform their respective functions as described herein. In accordance with embodiments of the present invention, one or more of the FETs 310-311 may be implemented to contain parasitic body diodes, which will act to allow current flow in only one direction when the conducting channel(s) of their respective FETs 310-311 are in their OFF state. In accordance with certain embodiments of the present invention, the switching element 311 may be configured without a parasitic body diode.

The PSU 301 may include well-known internal electronics (not shown) configured to send output signals over a signal line 312, such as a digital logic level or an analog signal (noted as AC_OK), indicating whether or not the PSU 301 is supplying sufficient power to the load 305 via the distribution bus 304 (e.g., indicating whether the PSU 301 is functioning properly or has failed, or that the AC Line input voltage is within a normal (e.g., required) operating range). The controller 302 is provided with this input signal (AC_OK) over the signal line 312 from the PSU 301 to monitor the AC Line input voltage. Note that, in accordance with embodiments of the present invention, one or more power supplies (PSUs) 301 can be connected to the distribution bus 304 to supply power to the load 305.

In accordance with certain embodiments of the present invention, the battery system 306 may further include a current sensor 307 configured to detect and measure electrical current flowing into or out of the battery 308. The current sensor 307 may be configured as a sense resistor coupled to an amplifier, such as depicted in FIG. 3. In accordance with certain embodiments of the present invention, the controller 302 may be configured to measure both the magnitude (e.g., in amperes) and direction (either negative or positive) of the current being extracted from or delivered to the battery 308 through the current sensor 307. Utilization of the current sensor 307 is further described with respect to FIGS. 4-5.

In the exemplary embodiment described with respect to FIG. 3 where the number, N, of discharge switches equals 1, the characteristic operating voltage range of the battery 308 may be configured to substantially match the specified load voltage tolerance range to be supplied to the distribution bus 304 (e.g., as required by the load 305), such as indicated as Region 2 in FIGS. 10 and 11.

In accordance with certain embodiments of the present invention, the controller 302 may be configured to switch ON a charge control FET 309 (or any suitable switching element) to allow charging of the battery 308 by a separate charging circuit ("Charger") 303. The FET 309 may also include a parasitic body diode as depicted in FIG. 3. Furthermore, embodiments of the present invention may further include a diode 330 (or equivalent circuit element(s)) configured to prevent power from the battery 308 from passing through to the charger 303.

Multi-Switch Battery Operation—Power Switching from PSU to Battery

Figure 4:
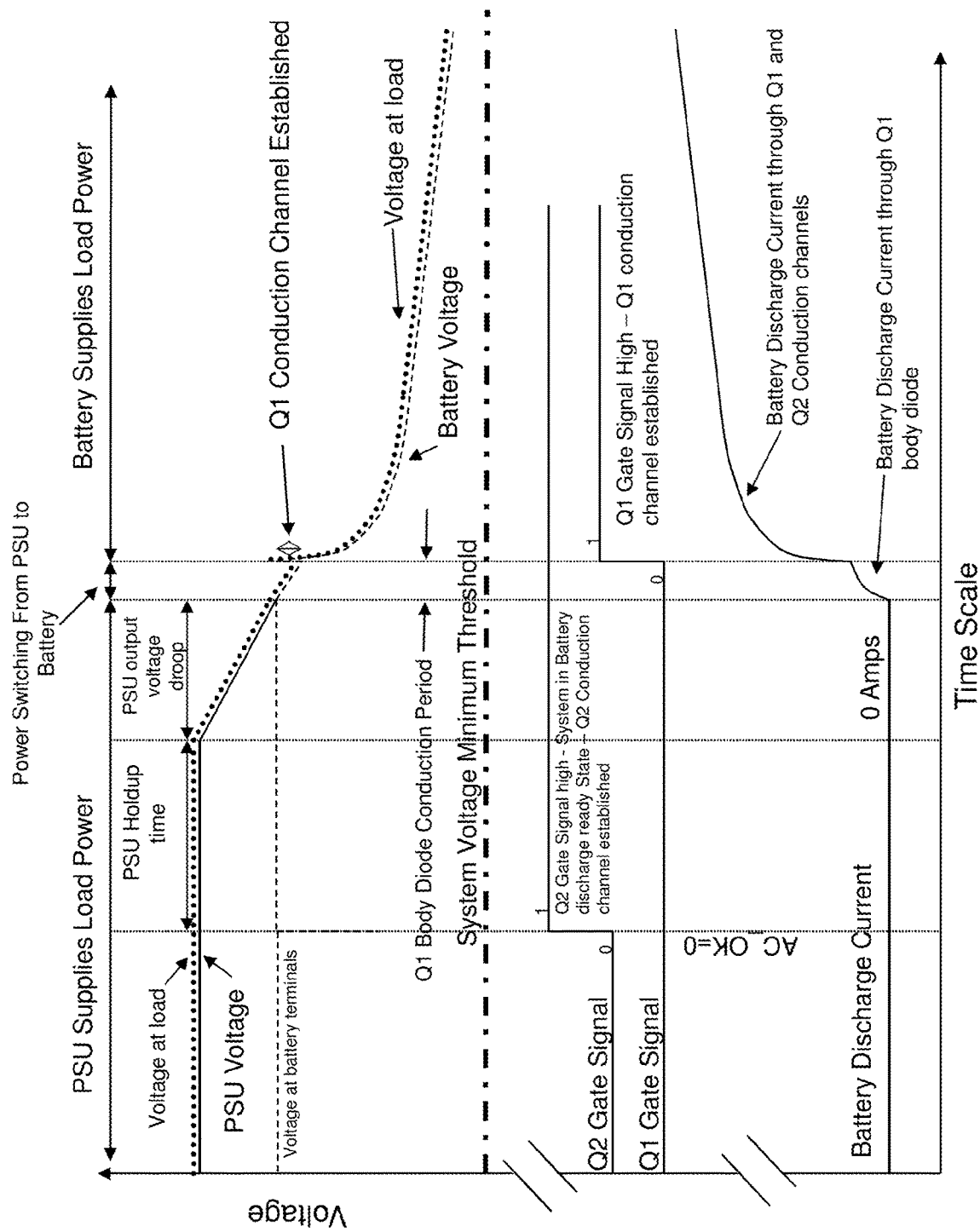
FIG. 4 illustrates an exemplary operation of the system of FIG. 3 showing a transition of the system from a state where a power supply unit supplies power to a load to a state where the battery supplies power to the load.

Referring to FIGS. 3 and 4, the following describes an exemplary non-limiting programmable configuration of a multi-switch connection of the battery 308 to the load 305 via the distribution bus 304, such as during a loss of AC Line input power to the PSU 301, or a failure of the PSU 301. In accordance with embodiments of the present invention, the system 300 may be configured so that the battery 308 provides power to the load 305 when the voltage from the PSU 301 feeding the distribution bus 304 decreases below a threshold level (e.g., below an allowable lower limit of a specified load voltage tolerance range) for some reason. As an example, consider that at some point in time, the AC Line input voltage to the PSU 301 is removed, or the PSU 301 fails to appropriately operate (referred to herein as a "PSU Failure Event"). For example, this may be due to an external AC power outage providing the AC Line input voltage.

When circuitry within the PSU 301 fails or there is a drop in AC Line input voltage detected by internal electronics of the PSU 301, the PSU 301 may be configured to cause a state change of the AC_OK signal (e.g., AC_OK=0) on the signal line 312 as a warning to the overall system that the PSU 301 has experienced a PSU Failure Event, and a power shutdown may be occurring. In FIG. 4, the voltage supplied to the load 305 (referred to as the "Voltage at Load") is represented by a dotted line, the voltage supplied by the PSU 301 (referred to as the "PSU Voltage") is represented by the adjoining solid line, and the voltage supplied by the battery 308 is represented by the dashed line.

In accordance with embodiments of the present invention, the PSU 301 may contain one or more well-known energy storage elements (e.g., capacitors, not shown) configured to store energy received from the AC Line, which allows the PSU Voltage on the bus 304 to remain substantially constant for a short period of time even in the absence of AC input power, referred to as the "PSU Holdup time" in FIG. 4. In accordance with embodiments of the present invention, this PSU Holdup time may typically range in timescale from 2 milliseconds to 20 milliseconds, though the exact duration of PSU Holdup time will depend upon the energy storage capacity of such energy storage element(s). When the energy storage element(s) inside the PSU 301 begin to run out of this stored energy, the PSU Voltage on the bus 304 begins to droop or sag at some specific decay rate as determined by the internal circuits and external load (e.g., the energy storage element(s)) of the PSU 301 and the instantaneous output power draw from the PSU 301 (e.g., by the load 305). Voltage droop is well known in the art as the gradual reduction in output voltage from a device as it drives a load under conditions of constrained power delivery. This voltage droop is depicted in the PSU Voltage curve in FIG. 4 as "PSU Output Voltage Droop."

The controller 302 may be configured to turn ON the FET 311 (e.g., by asserting an appropriate voltage on the Q2 Gate Drive line 322 (referred to as the "Q2 Gate Signal High" in FIG. 4)) in response to receipt of the state change in the AC_OK signal (e.g., AC_OK=0) on the signal line 312. This causes the voltage from the battery 308 to be connected to the bus 304 through the body diode of the FET 310, as the conducting channel of the FET 310 remains OFF (since the controller 302 is configured at this time to output on the Q1 Gate Drive line 321 a voltage signal insufficient to turn ON the conducting channel of the FET 310). Any current that attempts to flow in the reverse direction (i.e., into the battery 308) from the distribution bus 304 is blocked by the body diode of the FET 310, but power can flow from the battery 308 into the distribution bus 304 at the instant that voltage on the bus 304 drops below the voltage from the battery 308 minus the forward voltage of the body diode of the FET 310 ($V_{batt}-V_{fQ1}$). This condition is referred to as the "Battery Discharge Ready State" in FIG. 4.

As the energy storage elements inside the PSU 301 begin to run out of energy, the voltage on the bus 304 will drop until it reaches a point where it is equal to the voltage from the battery 308 minus the forward voltage of the body diode of the FET 310 ($V_{batt}-V_{fQ1}$). At this point, the battery 308 begins to deliver current to the distribution bus 304 (and thus also the load 305) through the body diode of the FET 310 (Q1 Body Diode Conduction Period), and the battery 308 and the PSU 301 are sharing current (denoted by "Battery Current" and "PSU Current" in FIG. 3) onto the distribution bus 304. This is referred to herein as "Power Switching from PSU to Battery" of the battery 308 discharge period in FIG. 4. In accordance with embodiments of the present invention, once the body diode of the FET 310 starts to conduct, the controller 302 may be configured to detect a non-zero current flowing out of the battery 308 onto the distribution bus 304, which may be accomplished by the transmission of a signal (e.g., analog) proportional to the instantaneous current in current sensor 307, which is sent to the controller 302 on the Battery Current Measure line 325.

At this point, to prevent further power dissipation (and corresponding heat generation) in the body diode of the FET 310, the controller 302 may be configured to turn ON the FET 310 (e.g., by asserting an appropriate voltage on the Q1 Gate Drive line 321 (referred to as the "Q1 Gate Signal High" in FIG. 4)), causing a conduction channel to be established within Q1, which diverts current from the high-dissipation body diode to the low dissipation conducting channel thus reducing the overall power dissipation in the FET 310. The condition of both FETs 310 and 311 being turned ON is referred to herein as "Battery Discharge Current through Q1 and Q2 Conduction Channels" in FIG. 4. This condition of both of the FETs 310 and 311 in the "ON" state and the battery 308 sharing load current with the PSU 301 will continue until the low energy threshold of the energy storage element(s) in the PSU 301 is reached, at which time the PSU 301 will cease operation or switch off. At switch-off of the PSU 301, the battery 308 will take over powering the load 305. This condition corresponds to operation within the Region 2 area of the battery 308 discharge as shown in FIGS. 9 and 10 where the battery 308 is connected to the load 305 via the bus 304. Typical loads 305 may normally exhibit constant power characteristics, so the battery 308 current will slowly rise commensurate with the rate that the voltage of the battery 308 is falling, as depicted in FIG. 4. The battery 308 will discharge normally as its stored energy is expended, and the controller 302 will terminate the battery discharge when it detects that the battery terminal voltage has reached the minimum allowable bus voltage or crossed into what is referred to herein as the Region 3 area of the battery 308 discharge shown in FIGS. 9 and 10. This point may be determined by a predetermined lower voltage limit defined by the application or load circuit limits on minimum allowable load voltage (e.g., a lower limit of a specified load voltage tolerance range). Any energy remaining in the battery 308 once the Region 3 area is reached will not be available to the bus 304.

As the battery 308 runs out of chemical energy, the controller 302, in response, may be configured to turn OFF both of the FETs 310 and 311 (e.g., via the Q1 Gate Drive line 321 and the Q2 Gate Drive line 322), thus isolating the battery 308 from the distribution bus 304, removing power from the load and terminating its operation. The total run time depicted in FIG. 4 may be determined by the load 305 and overall energy storage capability of the cells in the battery 308.

Multi-Switch Operation—Power Switching from Battery to PSU

Figure 5:
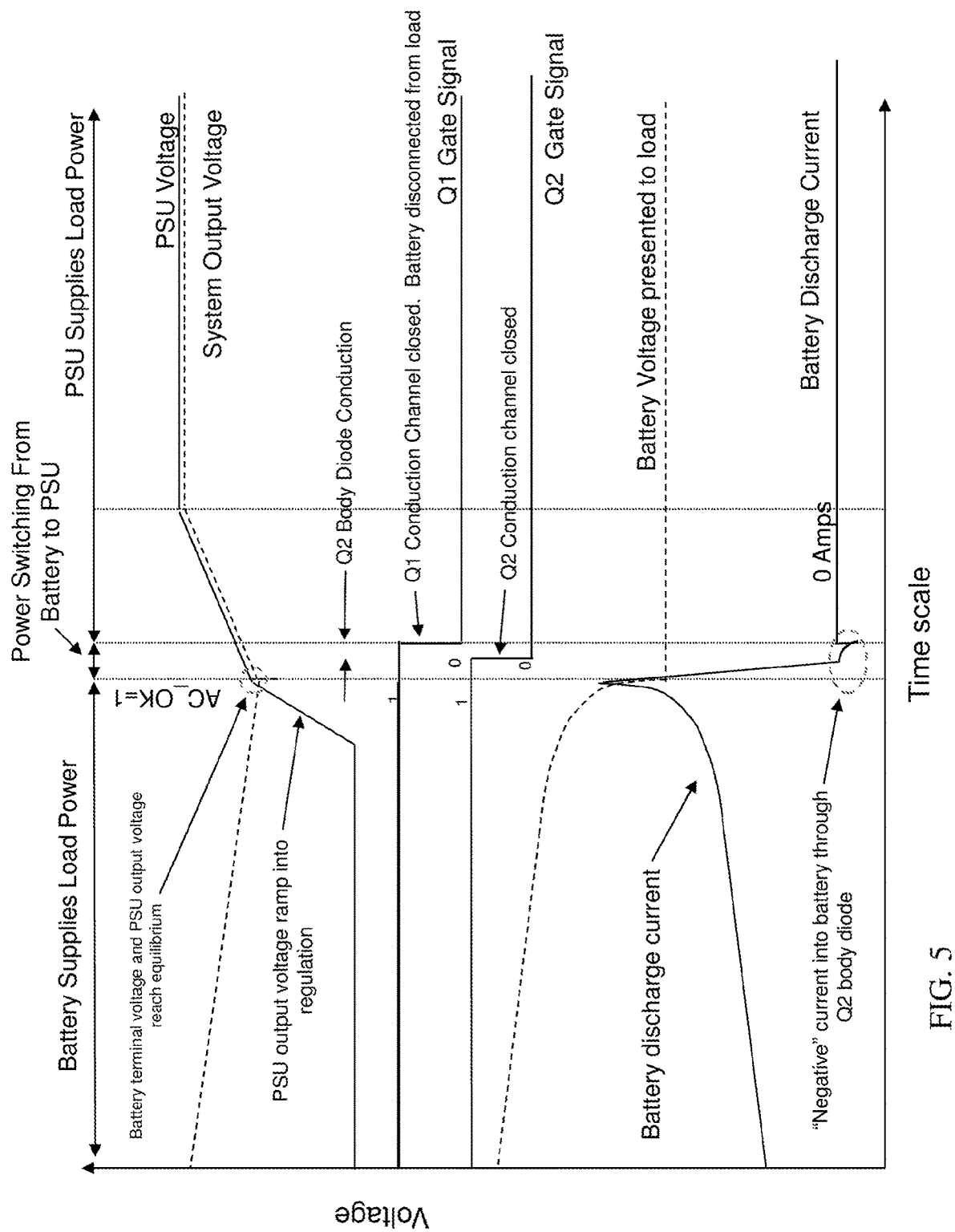
FIG. 5 illustrates an exemplary operation of the system of FIG. 3 showing a transition of the system from a state where the battery supplies power to the load to a state where the power supply unit supplies power to the load.

Referring to FIG. 5, assuming that the cells of the battery 308 are not yet fully depleted, and the battery 308 is still delivering current into the distribution bus 304 when the AC Line power is restored to the PSU 301 (or normal operation of the PSU 301 is otherwise restored), the PSU 301 may be configured to begin its startup sequence, changing the state of the AC_OK signal (e.g., AC_OK=1) on the signal line 312, and the PSU output voltage (depicted as the "PSU Voltage" line in FIG. 5) connected to the distribution bus 304 will begin to rise ("PSU Output Voltage Ramp"). When the rising PSU Voltage matches the distribution bus 304 voltage, the PSU 301 will begin to take over a portion of the current delivered to the load 305. Thereafter, when the PSU Voltage begins to rise above the voltage of the battery 308, a reverse (charging) current will appear at the output terminal of the battery 308 (referred to as "Negative Current into Battery" in FIG. 5), which may be sensed by the current sensor 307. When both a valid AC_OK=1 signal from the PSU 301 AND a "Negative Current into Battery" are detected, the controller 302 will change the state of the Q2 Gate Drive signal 322 to the FET 311, causing the Q2 conduction channel of the FET 311 to be closed. At some time later when the output voltage of the PSU 301 is stable, the controller 302 may be configured to turn OFF the FET 310 via its Q1 Gate Drive signal 321, which serves to isolate the battery 308 from the distribution bus 304. The PSU Voltage may then continue to rise until the PSU 301 achieves its normal operating voltage regulation levels, and the PSU 301 may continue in this condition until another power outage event occurs.

Figure 6:
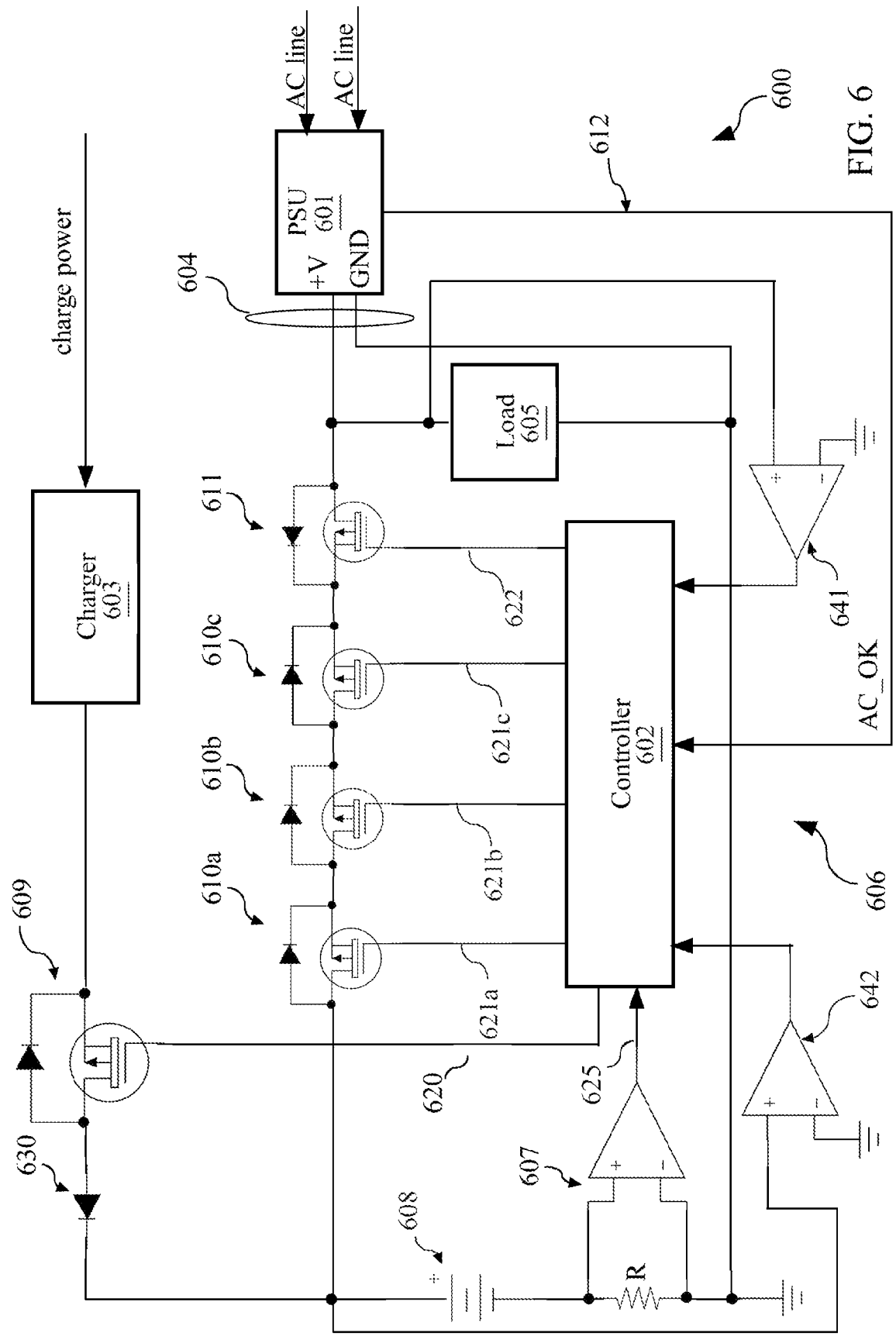
FIG. 6 illustrates a circuit block diagram of a system, configured in accordance with embodiments of the present invention, in which a set of series-connected switches are utilized in place of one of the switches in FIG. 3.

FIG. 6 illustrates a circuit block diagram of a system 600 configured in accordance with embodiments of the present invention. Each of the elements in the system 600 may operate in a similar manner as the correspondingly labeled elements previously described with respect to the system 300. The system 600 employs a battery system 606 configured to selectively couple an output terminal of a battery 608 to a distribution bus 604 through a defined switching configuration (i.e., a number of series-connected switches). In accordance with embodiments of the present invention, this defined switching configuration includes a series of N (where N≥2) charge control switches (e.g., FETs, which may be MOSFETs) connected in series between the battery 608 and the distribution bus 604, where each FET is independently controlled by a controller 602.

The system 600 may be utilized for battery systems that have battery terminal voltage operating points that extend above the specified load voltage tolerance range (e.g., as required by a load 605; for example, see the Region 2 area shown in the example of FIG. 11). As discussed elsewhere herein, typical batteries have operating points that lie outside such a more narrow specified load voltage tolerance range required by many loads. Therefore, the system 600 can be employed to regulate the supplied battery voltage substantially within this specified load voltage tolerance range. In accordance with certain embodiments of the present invention, the voltage of the battery 608 may be configured to lie above the specified load voltage tolerance range of the distribution bus 604 at some SOC and battery current conditions, and substantially match the specified load voltage tolerance range of the distribution bus 604 under other SOC or battery current conditions.

The system 600 includes a well-known power supply unit ("PSU") 601 powered via a well-known AC Line input voltage. The PSU 601 converts the AC Line input voltage to a DC output voltage, which feeds the distribution bus 604 to which the load 605 is connected. In accordance with embodiments of the present invention, the battery system 606, the defined switching configuration, and the PSU 601 combine to form a multi-switch battery backup unit ("BBU"). The BBU can be configured to function as a normal power supply when the AC Line input voltage is present and within normal operating limits. If the output of the PSU 601 falls (e.g., due to an AC Line input voltage loss or internal malfunction of the PSU 601), the system 600 may be configured to supply sufficient power from an appropriately sized battery 608 to operate the load 605 for a minimum defined duration (e.g., long enough to switch to generator back up or complete a proper shut-down procedure). Thus, the battery system 606 may be configured to function as a backup power source should the AC Line input voltage to the PSU 601 fail (or the output of PSU 601 falls outside the normal or required operating range), or the PSU 601 fails or unexpectedly ceases operation.

In accordance with embodiments of the present invention, the battery system 606 includes the battery 608 and a controller 602. The battery 608 may be implemented as one or more battery cells (e.g., Li-ion cells). The controller 602 may include any circuitry configured to perform the functions described herein, or be implemented as any other circuitry, IC module, or microprocessor capable of performing the functions described herein with respect to the controller 602.

In the non-limiting exemplary embodiment illustrated in FIG. 6, the system 600 implements a network of N (where N≥2) charge control switches (e.g., N MOSFETs 610a . . . 610c) in place of the FET 310 of FIG. 3. The number of series-connected charge control FETs can range from 2 to any greater number that can be practically controlled by the implemented controller 602. The number, N, of FETs may be determined by the difference in maximum battery stack voltage and the required output voltage (e.g., as determined by a specified load voltage tolerance range (for example, see Region 2 in FIG. 11)). In accordance with embodiments of the present invention, the circuitry within the controller 602 can be configured to appropriately turn ON and OFF each of the FETs 609, 610a ... 610c, and 611 (e.g., via the gate drive lines 620, 621a ... 621c, and 622, respectively) as needed to implement the functions of embodiments of the present invention described herein. Alternatively, any one or more of the FETs 609, 610a ... 610c, and 611 may be replaced with any circuitry suitable to perform their respective functions as described herein.

The controller 602 may be configured to independently turn each of the FETs 610a ... 610c, and 611 ON and OFF. In accordance with embodiments of the present invention, one or more of the FETs 610a ... 610c, and 611 may be implemented to contain parasitic body diodes, which will act to prevent current flow into the battery (charging current) when the respective FETs 610a ... 610c are in the OFF state, and prevent discharge current into the load when the FET 611 is in the OFF state. In accordance with certain embodiments of the present invention, the switching element 611 may be configured without a parasitic body diode. In accordance with alternative embodiments of the present invention, in order to minimize power losses (and resultant heat generation) in the FET packages (i.e., the N charge control FETs 610a ... 610c, and discharge control FET 611) when current is conducting through the body diodes, external Schottky diodes (not shown) may also be connected in parallel with (or be built into the package of) any or all charge control switches.

The PSU 601 may include internal electronics (not shown) configured to send output signals over a signal line 612, such as a digital logic level or an analog signal (noted as AC_OK), indicating whether or not the PSU 601 is supplying sufficient power to the load 605 via the distribution bus 604 (e.g., indicating whether the PSU 601 is functioning properly or has failed, or that the AC Line input voltage is within a normal (e.g., required) operating range). The controller 601 is provided with this input (AC_OK) over the signal line 612 from the PSU 601 to monitor the AC Line input voltage. Note that, in accordance with embodiments of the present invention, one or more power supplies (PSUs) 601 can be connected to the distribution bus 604 to supply power to the load 605.

In accordance with certain embodiments of the present invention, the battery system 606 may further include a current sensor 607 configured to detect and measure electrical current flowing into or out of the battery 608. The current sensor 607 may be configured as a sense resistor R coupled to an amplifier (e.g., an OPAMP), which outputs a signal on the battery current sensor line 625. In accordance with certain embodiments of the present invention, the controller 602 may be configured to measure both the magnitude (e.g., in amperes) and direction of the current being extracted from or delivered to the battery 608 through the current sensor 607. The system 600 may further include a battery voltage feedback circuit 642 and a load voltage feedback circuit 641 configured to function as voltage sensors to determine a voltage level of the battery 608 and an output voltage level at the load 605.

In accordance with certain embodiments of the present invention, the controller 602 may be configured to switch ON a charge control FET 609 (or any suitable switching element) to allow charging of the battery 608 by a charging circuit ("Charger") 603. The FET 609 may also include a parasitic body diode as depicted in FIG. 6. Furthermore, embodiments of the present invention may further include a diode 630 (or equivalent circuit element(s)) configured to prevent power from the battery 608 from passing through to the charger 603.

Upon battery connection and substantially concurrently with the start of current delivery to the load 605 from the battery 608 (corresponding to the turning ON of the FET 611), the battery terminal voltage will pull down or drop in accordance with the characteristic impedance curve of the battery 608, and the voltage provided to the distribution bus 604 will be the resulting battery terminal voltage reduced by the sum of the total forward voltage drops of each body diode times the number of the N FETs 610a ... 610c that are in an OFF state (as determined by the controller 602). The controller 602 may be configured to sense the battery voltage via the voltage sensor 642 and the output voltage (to the load 605) via the voltage sensor 641, and in response determine the number of charge control switches (e.g., the N FETs 610a ... 610c) needed to be ON or OFF in order to maintain the voltage at the load 605 within a desired operating range (e.g., a specified load voltage tolerance range (for example, see Region 2 depicted in FIG. 11)). As the battery voltage continues to drop as a result of either increasing current (impedance curve effect) or by reducing its state of charge (SOC based voltage drop), the N FETs 610a ... 610c may be turned ON in a predetermined programmed manner (e.g., sequential, binary counting, or any other sequence) by the controller 602 in response to changing voltage conditions as sensed by the voltage sensors 642 and 641 to reduce the total number of series forward diode voltage drops between the battery terminal and the output (load) terminal in order to regulate the voltage supplied by the battery 608 to the load 605. Likewise, a sudden reduction in current drawn by the load 605 that causes a battery terminal voltage increase due to the characteristic impedance effect can be compensated for by the controller 602 turning OFF one or more of the N FETs 610a ... 610c, thus adding one or more forward diode voltage drops back into the series circuit of the N FETs 610a ... 610c.

Figure 12:
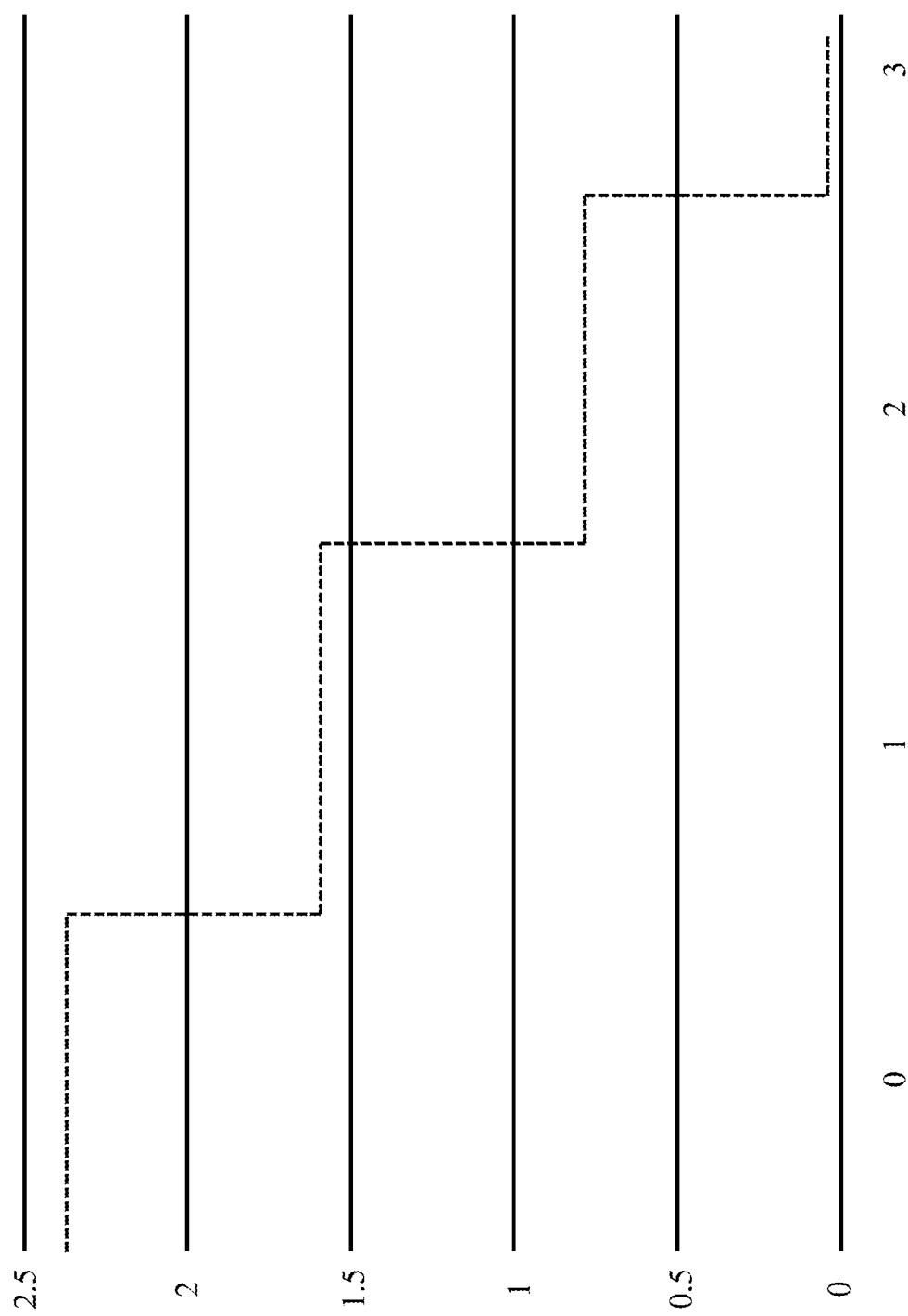
FIG. 12 illustrates a non-limiting example of a regulating scheme that may be implemented within the system of FIG. 6.

A non-limiting example of a regulating scheme that may be implemented within the controller 602 is depicted in FIG. 12, which shows a total voltage drop across the N (where N=3) series-connected FETs 610a ... 610c as a function of the number of FETs (0 ... N) that are turned ON or OFF. As can be seen, the total voltage drop across the network of the N FETs 610a ... 610c may be controlled by the controller 602 in discrete steps from essentially 0 V to a voltage defined by the number, N, of FETs, which is determined by the difference between the required load voltage (and its tolerance) and the maximum voltage at the terminals of battery 608 (in this example where N=3, approximately 2.4 V). Due to its placement in the circuit between the output terminal of the battery 608 and an input terminal of the load 605, the load 605 sees its input voltage to be the terminal voltage of the battery 608 minus the voltage drop across the FET network. By this technique, regulation of the voltage provided to the load 605 (e.g., substantially within a specified load voltage tolerance range) can be achieved and maintained through switching ON/OFF of the N FETs 610a ... 610c by the controller 602 to adjust the voltage drop across the FET network. In accordance with embodiments of the present invention, the controller 602 may also be configured to turn ON/OPP any one or more of the FETs 610a ... 610c and 611 in order to minimize power dissipation in the body diode of any individual FET.

In accordance with embodiments of the present invention, there are a number of widely known control techniques such as implementation of error amplifiers, state space control, or hysteretic control methods that may be implemented in the controller 602 to determine the sequence and timing of turning ON or OFF any specific FET (e.g., the N FETs 610a . . . 610c) in response to the voltage sensing provided by the sensors 642 and 641 and the current sensing provided by the sensor 607.

Figure 7:
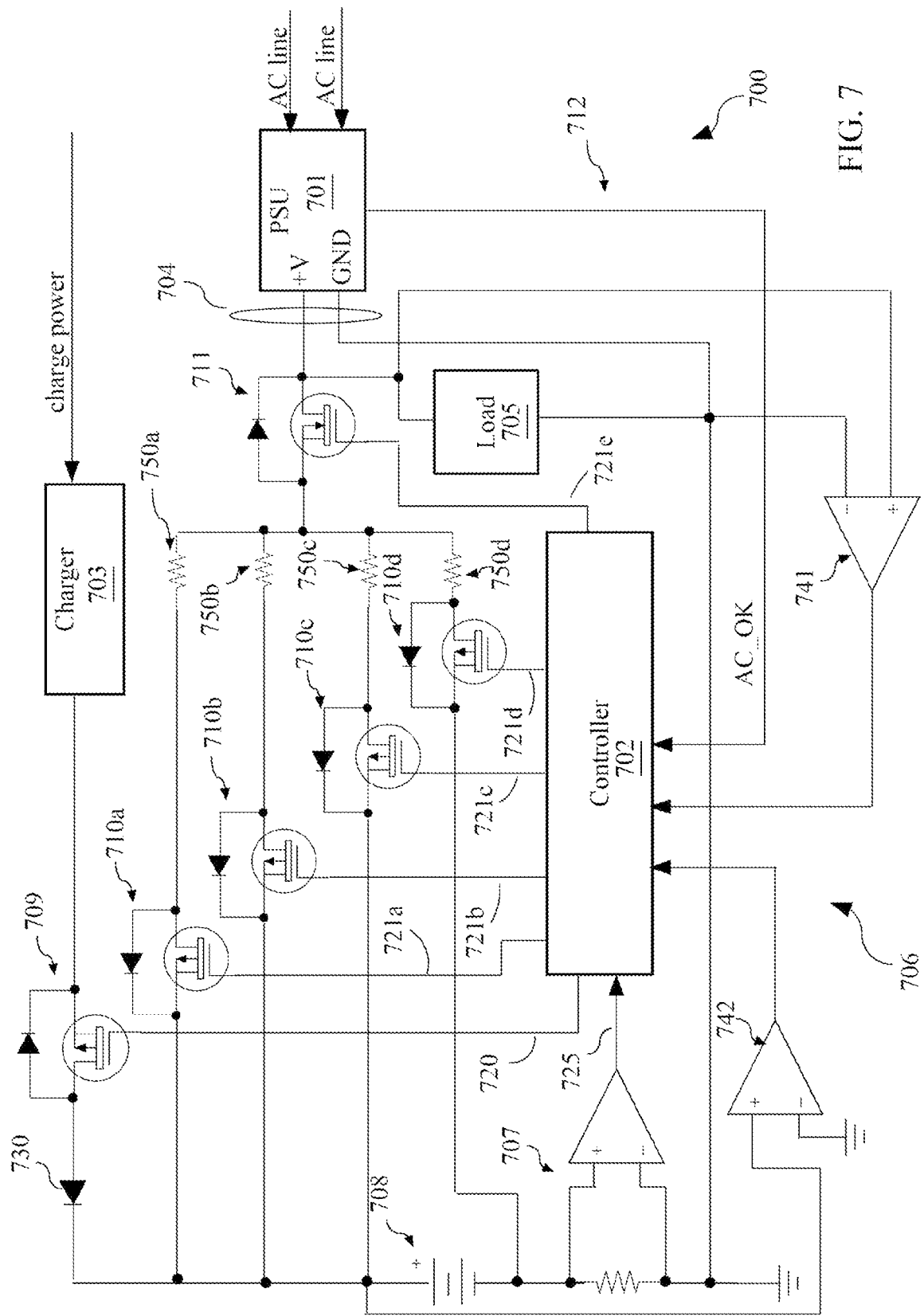
FIG. 7 illustrates a circuit block diagram of a system, configured in accordance with embodiments of the present invention, in which a set of parallel-connected switches are utilized in place of one of the switches in FIG. 3.

FIG. 7 illustrates a circuit block diagram of a system 700 configured in accordance with embodiments of the present invention. Each of the elements in the system 700 may operate in a similar manner as the correspondingly labeled elements previously described with respect to the systems 300 and 600. The system 700 employs a battery system 706 configured to selectively couple an output terminal of a battery 708 to a distribution bus 704 through a defined switching configuration. In accordance with embodiments of the present invention, this defined switching configuration includes a network of N (where N≥2) parallel-connected discharge switches 710a . . . 710d (e.g., MOSFETs), each coupled in series with a resistor 750a . . . 750d to form a network of N FET/resistor pairs.

The system 700 may be utilized for battery systems that have battery terminal voltages that extend above the specified load voltage tolerance range (e.g., as required by a load 705; for example, see the Region 2 area shown in the example of FIG. 11). As discussed elsewhere herein, typical batteries have terminal voltages at certain operating points that that lie outside such a more narrow specified load voltage tolerance range required by many loads. Therefore, the system 700 can be employed to regulate the supplied battery voltage substantially within this specified load voltage tolerance range. In accordance with certain embodiments of the present invention, the voltage of the battery 708 may be configured to lie above the specified load voltage tolerance range of the distribution bus 704 at some SOC and battery current conditions, and substantially match the specified load voltage tolerance range of the distribution bus 704 under other SOC or battery current conditions.

Each of the resistors 750a . . . 750d may be configured with a different resistive value, and may be configured such that the resistive value of each resistor in the series 750a . . . 750d is lower than the previous resistor in the series (e.g., the resistor 750b has a resistive value lower than the resistor 750a, the resistor 750c has a resistive value lower than the resistor 750b, etc.). The FET/resistor pairs may be connected in parallel between the battery terminal and the distribution bus 704 through another switching element (e.g., a MOSFET) 711 that prevents charging of the battery directly from the distribution bus 704, and where each of the N FETs 710a . . . 710d and its paired resistor, as well as the FET 711, is independently controlled by the controller 702 via the control lines 721a . . . 721e. However, embodiments of the present invention may be implemented with one or more of the resistors 750a . . . 750d having substantially equivalent resistive values.

The number, N, of parallel-connected discharge control FET/resistor pairs can range from 2 to any number that can be practically controlled by the controller 702. The number, N, of discharge control FET/resistor pairs may be generally determined by a number of factors such as the minimum and maximum voltages available from the battery stack, the expected range of minimum and maximum output currents, and the required minimum and maximum output voltage range (e.g., as determined by a specified load voltage tolerance range (for example, see Region 2 in FIG. 11)).

In accordance with embodiments of the present invention, the battery 708 may be connected to the distribution bus 704 by activating (e.g., turning ON) by the controller 702 one or more of the N FETs 710a . . . 710d in a programmed manner (e.g., sequential, binary counting sequence, or any other sequence), such as beginning with the FET 710a, which may be paired with the highest resistive value resistor 750a. Upon turning ON of the FET 710a, current will commence flowing to the load 705, and the terminal voltage of the battery 708 will begin to drop in accordance with the battery impedance characteristic curve. If the current of the load 705 through the series combination of the FET/resistor pair 710a/750a is sufficiently high, the voltage drop across the series combination of the FET/resistor pair 710a/750a will increase until the voltage at the load 705 drops to a predetermined threshold, which may be set (e.g., within the controller 702) in accordance with a minimum regulation point specification of the load 705 (e.g., a lower limit of a specified load voltage tolerance range). As this threshold is reached and sensed by the controller 702 through the output voltage sensor 741, the controller 702 may be configured to turn OFF the FET/resistor pair 710a/750a, and turn ON the FET paired with the resistor 750b, which may have the next highest resistive value among the series of resistors 750a . . . 750d. In accordance with embodiments of the present invention, the resistor 750b in series with the FET 710b can be configured to have a resistive value significantly smaller than that of the resistor 750a, and thus the voltage drop across the series combination of the FET 710b and the resistor 750b will be lower than that across the series combination of the FET 710a and the resistor 750a. An effect of this will be to raise the output voltage to the load 705 above the previously noted threshold pertaining to the minimum regulation point specification of the load 705 (e.g., a lower limit of a specified load voltage tolerance range), and thus keep the output voltage to the load 705 above this minimum predetermined threshold. In this way, the output voltage to the load 705 can be maintained by the controller 702 within the regulation window (e.g., the specified load voltage tolerance range (for example, see Region 2 in FIG. 11)) under changing battery terminal voltages and load currents, as sensed by the controller 702 via the battery voltage sensor 742, the output voltage sensor 741, and the current sensor 707, by the controller 702 selectively activating the N FETs 710a . . . 710d (e.g., in an upward binary counting sequence) to raise the load voltage, and selectively deactivating the N FETs 710a . . . 710d (e.g., in a downward binary counting sequence) to lower the load voltage, where the FET 710a is associated with the least significant bit of the binary sequential counter, and the FET 710d (or higher) is associated with the most significant bit.

Figure 13:
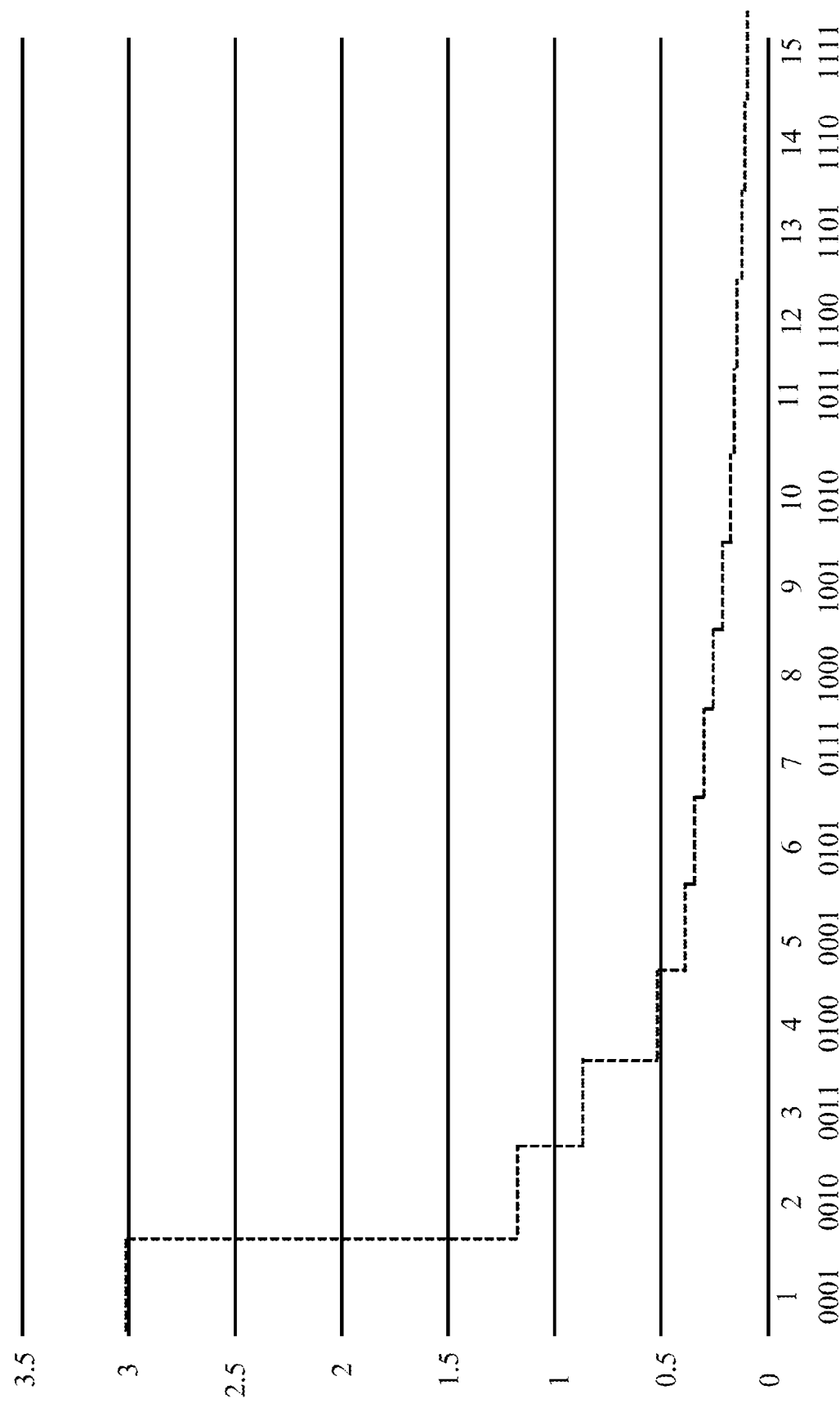
FIG. 13 illustrates a non-limiting example of a regulating scheme that may be implemented within the system of FIG. 7.

A non-limiting example of a regulating scheme that may be implemented within the controller 702 is depicted in FIG. 13, which shows a total voltage drop across the parallel-connected FET/resistor pairs as a function of a binary counting sequence for selective activation by the controller 702 of the N FETs 710a . . . 710d. As can be seen, the voltage drop across the FET/resistor pair network may be controlled in $N^2$ discrete steps (e.g., 16 when N=4) to range from essentially 0 V to some desired maximum voltage (in this example, approximately 3.0 V). Due to its placement in the circuit between the output terminal of the battery 708 and the input terminal of the load 705, the load 705 sees its input voltage to be the terminal voltage of the battery 708 minus the voltage drop across the FET/resistor pair network. By this technique, regulation of the voltage provided to the load 605 (e.g., substantially within a specified load voltage tolerance range) can be achieved and maintained through switching ON/OFF of the N FETs 710a . . . 710d by the controller 702 to adjust the voltage drop across the FET/resistor pair network.

In accordance with embodiments of the present invention, such a network of N parallel discharge switching elements (i.e., the N FET/resistor pairs) can be configured to operate (e.g., in response to instructions received from the controller 702) as a high current digital-to-analog converter where the source voltage (i.e., from the battery 708) is not constant over time (e.g., see FIG. 8). In this configuration, information from the voltage sensors 741, 742 and the current sensor 707 may be utilized by the controller 702 to compensate for variations in both input and output voltages (i.e., the battery 708 and the load 705).

The resulting system 700 is thus configured as a network of N fixed impedance elements (i.e., the N FETs 710a . . . 710d and associated resistors 750a . . . 750d), which can be switched in and out of the network by the controller 702 to compensate for changes in voltages on the input (i.e., the battery 708) and the output (i.e., the load 705). Varying the resistive values of the resistors 750a . . . 750d will define the individual element impedances. In accordance with embodiments of the present invention, each FET/resistor pair can be configured with a specific voltage drop at a predetermined applied current. As a result, the system 700 can be configured to control a network of elements defining a variable, controllable impedance between the battery 708 and the load 705. As the voltage of the load 705 increases, the network is adjusted by the controller 702 such that the total impedance is increased and voltage delivered to the load 705 is decreased. As the voltage of the battery 708 decreases, the network is reconfigured by the controller 702 such that the total impedance is reduced and thus the voltage across the network is also reduced, serving to maintain the voltage delivered to the load 705 within a desired range (e.g., substantially within a specified load voltage tolerance range). The compensating voltage drop across the network which is subtracted from the battery voltage can then be controlled by the controller 702 using any number of different control techniques such that a resulting voltage delivered to the load 705 is controlled through sequencing of the various N FET/resistor pairs in the system 700 to provide high resolution voltage matching whenever the battery operating point exists (e.g., drifts for whatever reason) within the Region 1 operating range (e.g., as shown in FIG. 11).

In accordance with embodiments of the present invention, there are a number of widely known control techniques such as implementation of error amplifiers, state space control, or hysteretic control methods that may be implemented in the controller 702 to determine the sequence and timing of turning ON or OFF a specific FET/resistor pair in response to the voltage sensing provided by the voltage sensors 741 and 742 and the current sensing provided by the current sensor 707.

As a result of the foregoing description, it can be readily appreciated that the system 600 or the system 700, or a system combining the FET networks of both of the systems 600 and 700, can be configured to maintain an output voltage provided to a load circuit from a battery within a desired range of voltages as the battery is discharging, including maintaining such an output voltage within a required operating voltage range (e.g., substantially within a specified load voltage tolerance range) so as to be able to implement the system 600 and/or the system 700 as a voltage regulator (e.g., for utilization as a BBU).

Referring again to FIG. 3, in an exemplary non-limiting embodiment, the PSU 301 may be configured to have an output voltage range of 40.8 V-55.2 V, which is a nominal 48 V output for the distribution bus 304 with a +/−15% variance. The PSU 301 may be coupled to a Li-ion battery stack 308 with 14 individual battery cells connected in series to define a 14S configuration. When charged to 3.95 V per battery cell, the battery 308 will have a fully charged voltage of 55.3 V and a fully discharged voltage of 39.2 V, and thus be within required specifications for such a 48 V distribution bus 304 (e.g., substantially within a specified load voltage tolerance range) for all conditions of charge and load except for the last 4%-5% of remaining capacity. This 14S cell configuration has a full charge and normal discharge voltage that allows for direct connection to the distribution bus 304 without requiring any reduction of battery voltage (i.e., as shown in FIG. 9, the battery voltage is constrained to the Region 2 operating area for 95% or more of its SOC range). Thus, this is a suitable application environment for embodiments of the present invention in which the number of such discharge switching elements is one (i.e., N=1) as shown in FIG. 3

During an event (e.g., a PSU Failure Event; see FIG. 4) causing the battery 308 to discharge into the distribution bus 304, the voltage of the battery 308 will drop under the applied load 305. The amount of voltage drop of the battery 308 will depend on the magnitude of the applied load 305 and the internal impedance of each of the battery cells in the battery 308. The battery cells of the battery 308 may be carefully chosen for their voltage, current, and impedance characteristics to be able to support the full power requirements of the distribution bus 304 to which they are connected, while maintaining a voltage drop small enough to keep the distribution bus 304 within its voltage limits (e.g., the aforementioned nominal 48 V output with a +/−15% variance) during the discharge event (e.g., substantially within a specified load voltage tolerance range).

Referring to FIG. 11, in yet another non-limiting exemplary embodiment of the present invention, a 4-cell battery pack may be configured to connect directly to a 12 V electrical bus. In comparison to the previous example, the battery V-I-SOC curve indicates that this 4 cell battery will operate for significant portions of its discharge in the Region 1 operating area before moving into the Region 2 area. In accordance with this non-limiting exemplary embodiment, a circuit configuration such as that shown in FIG. 6 and/or FIG. 7 could be utilized, allowing the battery terminal voltage to be reduced through a switched network implemented between the battery and the load.

Though embodiments of the present invention are disclosed herein as utilizing a battery as a power source (e.g., for battery backup purposes), embodiments of the present invention may be configured to utilize any appropriate type of power source. Correspondingly, the systems 300, 600, and/or 700 are suitable for utilization with any type of power source (instead of a battery) that has an unregulated output voltage (e.g., the output voltage of such a power source varies outside of a distribution bus voltage tolerance range).

As will be appreciated by one skilled in the art, aspects of the present invention (e.g., the controllers 302, 602, and/or 702) may be embodied as a system, method, and/or program product. Accordingly, aspects of the present invention (e.g., the controllers 302, 602, and/or 702) may take the form of an entirely hardware embodiment, an entirely software embodiment (including firmware, resident software, microcode, etc.), or embodiments combining software and hardware aspects that may all generally be referred to herein as a "circuit," "circuitry," "module," or "system." Furthermore, aspects of the present invention may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

It will also be noted that each block of the circuit block diagrams and/or the functionalities represented in the diagrams of FIGS. 4 and 5, and combinations of blocks in the circuit block diagrams and/or the functionalities represented in the diagrams of FIGS. 4 and 5, can be implemented by special purpose hardware-based systems that perform the specified functions or acts, or combinations of special purpose hardware and computer instructions. For example, a module (e.g., the controllers 302, 602, and/or 702) may be implemented as a hardware circuit comprising custom VLSI circuits or gate arrays, off-the-shelf semiconductors such as logic chips, transistors, controllers, or other discrete components. A module (e.g., the controllers 302, 602, and/or 702) may also be implemented in programmable hardware devices such as field programmable gate arrays, programmable array logic, programmable logic devices, or the like.

Unless defined otherwise, all technical and scientific terms used herein have the same meaning as commonly understood to one of ordinary skill in the art to which the presently disclosed subject matter belongs. The terms "a" and "an" mean "one or more" when used in this application, including the claims.

As used herein, the term "about" is used to provide flexibility to a numerical range endpoint by providing that a given value may be "a little above" or "a little below" the endpoint.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "and/or" and the use of the "/" character between two words when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The invention claimed is:

1. A backup system for a power supply unit providing power to a load via a distribution bus, the system comprising:
a power source;
first and second transistors connected in series between an output terminal of the power source and the distribution bus;
a first diode coupled in parallel with the second transistor; and
circuitry configured to selectively turn ON and OFF the first and second transistors to enable the power source to power the load via the distribution bus, wherein the circuitry is configured to turn ON the first transistor while maintaining the second transistor OFF in response to a signal that the power supply unit has experienced a failure, wherein the first diode is coupled to the second transistor as a parasitic body diode, wherein the turning ON of the first transistor results in a coupling of a first voltage supplied from the power source to the distribution bus via the first transistor and the parasitic body diode of the second transistor.

2. The system as recited in claim 1, wherein the circuitry is configured to turn ON the second transistor when a second voltage supplied from the power supply unit drops below the first voltage supplied from the power source minus a forward voltage of the first diode.

3. The system as recited in claim 2, wherein the circuitry is configured to turn OFF the first and second transistors in response to a signal that a sufficient voltage from the power supply unit to the distribution bus has been restored subsequent to the power supply unit experiencing the failure.

4. The system as recited in claim 1, wherein the circuitry is configured to turn ON the second transistor in response to detection of a non-zero current flowing out of the power source.

5. The system as recited in claim 4, further comprising a current sensor coupled to the power source, wherein the current sensor is configured to send a data signal to the circuitry that the non-zero current flowing out of the power source has been detected.

6. The system as recited in claim 1, wherein the power source is a battery comprising one or more series-connected cells.

7. The system as recited in claim 6, further comprising a third transistor coupled between the battery and a battery charger, wherein the circuitry is configured to turn ON the third transistor to charge the battery with the battery charger.

8. The system as recited in claim 7, wherein the third transistor couples the battery to the battery charger via a charging path not electrically coupled to the distribution bus.

9. The system as recited in claim 1, wherein the failure experienced by the power supply unit is a result of the power supply unit not receiving an AC line input voltage.

10. The system as recited in claim 1, wherein an output voltage level provided to the load via the distribution bus is regulated to be limited to a specified fixed value above or below a desired nominal value.

11. A backup system for a power supply unit providing power to a load via a distribution bus, the system comprising:
a power source;
first and second transistors connected in series between an output terminal of the power source and the distribution bus;
a first diode coupled in parallel with the second transistor; and
circuitry configured to selectively turn ON and OFF the first and second transistors to enable the power source to power the load via the distribution bus, wherein the circuitry is configured to turn ON the first transistor while maintaining the second transistor OFF in response to a signal that the power supply unit has experienced a failure, wherein the power source is a battery comprising one or more series-connected cells, wherein the circuitry is configured to turn OFF the first and second transistors in response to detection of a charging current flowing into the battery.

12. A backup system for a power supply unit providing power to a load via a distribution bus, the system comprising:
- a power source;
- first and second transistors connected in series between an output terminal of the power source and the distribution bus;
- a first diode coupled in parallel with the second transistor;
- circuitry configured to selectively turn ON and OFF the first and second transistors to enable the power source to power the load via the distribution bus, wherein the circuitry is configured to turn ON the first transistor while maintaining the second transistor OFF in response to a signal that the power supply unit has experienced a failure;
- a third transistor coupled in series with the first and second transistors; and
- a second diode coupled in parallel with the third transistor, wherein the first diode is coupled to the second transistor as a first parasitic body diode, wherein the second diode is coupled to the third transistor as a second parasitic body diode, wherein the turning ON of the first transistor results in a coupling of a first voltage supplied from the power source to the distribution bus via the first transistor, the first parasitic body diode of the second transistor, and the second parasitic body diode of the third transistor, wherein the circuitry is configured to selectively and independently turn ON/OFF the second and third transistors in order to regulate a second voltage supplied to the load as a function of forward voltage drops across the first and second parasitic body diodes.

13. A backup system for a power supply unit providing power to a load via a distribution bus, the system comprising:
- a power source;
- a network of N (where N>1) transistors coupled between an output terminal of the power source and the distribution bus, wherein each of the N transistors is coupled in parallel with a diode; and
- a controller configured to selectively and independently activate/deactivate the N transistors to enable the power source to power the load via the distribution bus with an output voltage level regulated as a function of a number of the N transistors activated/deactivated.

14. The system as recited in claim 13, wherein the diodes coupled to the N transistors are parasitic body diodes, wherein the output voltage level is regulated as a function of an amount of forward voltage drops across one or more of the parasitic body diodes pertaining to the activated/deactivated transistors.

15. The system as recited in claim 14, wherein the power source is a battery comprising one or more series-connected cells.

16. The system as recited in claim 15, wherein the output voltage level is regulated to be within a voltage range that has a maximum level lower than an initial discharge voltage of the battery.

17. The system as recited in claim 15, wherein the output voltage level is regulated to be within a specified load voltage tolerance range.

18. The system as recited in claim 13, wherein the network of N transistors comprises N series-connected transistors, wherein the output voltage level is regulated as a function of an amount of forward voltage drops across one or more of the diodes pertaining to the number of the N transistors activated/deactivated by the controller.

19. The system as recited in claim 13, wherein the network of N transistors comprises N parallel-connected transistor/resistor pairs, wherein the controller is configured to adjust a voltage drop across the network by activating/deactivating a specific number of the N parallel-connected transistor/resistor pairs as a function of an instantaneous current through the network and an input voltage to the network.

20. The system as recited in claim 13, further comprising a resistor coupled in series with each of the N transistors, wherein the network of N transistors comprises N parallel-connected transistors, wherein the output voltage level is regulated as a function of an amount of voltage drops across one or more of the resistors pertaining to the number of the N transistors activated/deactivated by the controller.

21. The system as recited in claim 20, wherein the output voltage level is also regulated as a function of an amount of forward voltage drops across one or more of the diodes pertaining to the number of the N transistors activated/deactivated by the controller.

22. The system as recited in claim 13, wherein the power source is a battery, wherein the controller is configured to sense a voltage of the battery via a first voltage sensor and the output voltage level via a second voltage sensor, and in response determine how many of the N transistors to activate/deactivate in order to maintain a voltage at the load within a specified load voltage tolerance range.

* * * * *